United States Patent
Kudoh et al.

(10) Patent No.: US 8,486,185 B2
(45) Date of Patent: Jul. 16, 2013

(54) INKJET RECORDING INK, INK CARTRIDGE AND INKJET RECORDING APPARATUS

(75) Inventors: Masaki Kudoh, Kanagawa (JP); Mariko Kojima, Tokyo (JP); Akiko Bannai, Kanagawa (JP); Keita Katoh, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 28 days.

(21) Appl. No.: 13/382,206

(22) PCT Filed: Jul. 13, 2010

(86) PCT No.: PCT/JP2010/062132
§ 371 (c)(1), (2), (4) Date: Jan. 4, 2012

(87) PCT Pub. No.: WO2011/007888
PCT Pub. Date: Jan. 20, 2011

(65) Prior Publication Data
US 2012/0121831 A1    May 17, 2012

(30) Foreign Application Priority Data

Jul. 14, 2009 (JP) ................... 2009-166040
Apr. 16, 2010 (JP) ................... 2010-095108

(51) Int. Cl.
*C09D 11/02* (2006.01)

(52) U.S. Cl.
USPC ................... 106/31.59; 106/31.89

(58) Field of Classification Search
USPC .......................... 106/31.59, 31.89
See application file for complete search history.

(56) References Cited

U.S. PATENT DOCUMENTS

| | | | |
|---|---|---|---|
| 7,284,851 B2 | 10/2007 | Bannai et al. |
| 7,682,011 B2 | 3/2010 | Namba et al. |
| 7,810,919 B2 | 10/2010 | Kojima et al. |
| 8,029,122 B2 | 10/2011 | Kojima et al. |
| 8,044,114 B2 | 10/2011 | Habashi et al. |
| 2005/0038286 A1 | 2/2005 | Bonrath et al. |
| 2006/0176349 A1 | 8/2006 | Nagai et al. |
| 2008/0070008 A1 | 3/2008 | Namba et al. |
| 2009/0258196 A1 | 10/2009 | Nagashima et al. |
| 2009/0263632 A1 | 10/2009 | Kojima et al. |
| 2010/0112219 A1 | 5/2010 | Yokohama et al. |
| 2011/0205288 A1 | 8/2011 | Matsuyama et al. |

FOREIGN PATENT DOCUMENTS

| | | |
|---|---|---|
| JP | 2005 511777 | 4/2005 |
| JP | 2006 145897 | 6/2006 |
| JP | 2006 316243 | 11/2006 |
| JP | 2008 270003 | 11/2008 |
| JP | 2009 001741 | 1/2009 |
| JP | 2009 032914 | 2/2009 |
| JP | 2012-017389 | * 1/2012 |

OTHER PUBLICATIONS

International Search Report Issued Oct. 19, 2010 in PCT/JP10/062132 Filed Jul. 13, 2010.

\* cited by examiner

*Primary Examiner* — Kaj K Olsen
*Assistant Examiner* — Veronica F Faison
(74) *Attorney, Agent, or Firm* — Oblon, Spivak, McClelland, Maier & Neustadt, L.L.P.

(57) ABSTRACT

An inkjet recording ink containing: water; a water-soluble organic solvent; a colorant; and at least one fluorochemical surfactant having a formula selected from the group consisting of (b), (a), (a'), and (h):

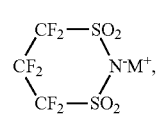

(b)

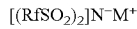

(a)

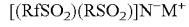

(a')

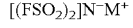

(h)

wherein $M^+$ is $Li^+$, $Na^+$, $K^+$, or $NH_4^+$, Rf is $CF_3$, $C_2F_5$, $C_3F_7$, or $C_4F_9$, and R is C1-C10 alkyl group.

20 Claims, No Drawings

INKJET RECORDING INK, INK CARTRIDGE AND INKJET RECORDING APPARATUS

TECHNICAL FIELD

The present invention relates to an inkjet recording ink, an ink cartridge including a container and the inkjet recording ink housed in the container, and an inkjet recording apparatus including the ink cartridge installed therein.

BACKGROUND ART

It is known that when a fluorochemical surfactant is added into an inkjet recording ink (hereinafter referred to simply as "ink"), the surface tension of the ink can be reduced, color material (colorant) components easily remain on the surface of a recording medium such as paper (because vehicles of the ink quickly permeate through the recording medium), and thus there is an improvement in image density and image properties.

However, when a conventional fluorochemical surfactant is used, there exists the following problem: hard-to-remove foam is easily generated, and is a hindrance to supply or ejection of ink.

In an attempt to solve this problem, PTL 1 discloses a method of adding a fluorochemical surfactant with a specific structure for the purpose of improving printing quality and ink ejection stability, and a method for improving defoaming quality by employing a specific means of filtration which is performed after the addition of a silicone anti-foaming agent.

Although this method can rectify most of the foaming problem, the use of the silicone anti-foaming agent gives rise to another problem. Specifically, since silicone anti-foaming agents are generally prepared by dispersing fine silica particles into silicone oil, the silicone anti-foaming agents are basically incompatible with aqueous inks and thus easily remain as extraneous matter or residues in a liquid passage of an inkjet recording apparatus, for example. Consequently, there is a serious problem in that ink ejection stability is hindered.

Also, when a conventional fluorochemical surfactant is used, PFOS (perfluorooctanesulfonic acid) or PFOA (perfluorooctanoic acid) will be generated in a production process. It should be noted that the U.S. Environmental Protection Agency (EPA) points out that any compound containing more than four carbon atoms bonded to fluorine atoms is liable to accumulate in human bodies. Therefore, the generation of PFOS or PFOA is problematic in terms of safety.

CITATION LIST

Patent Literature

[PTL 1] Japanese Patent Application Laid-Open (JP-A) No. 2009-1741

SUMMARY OF INVENTION

Technical Problem

The present invention provides an inkjet recording ink superior in foaming quality and defoaming quality and favorable in image density, ejection quality (ejection stability) and storage stability; an ink cartridge including a container and the inkjet recording ink housed in the container; and an inkjet recording apparatus including the ink cartridge installed therein.

Solution to Problem

The above-mentioned problems can be solved by <1> to <4> below.

<1> An inkjet recording ink including: water; a water-soluble organic solvent; a colorant; and any one of fluorochemical surfactants represented by General Formulae (b), (a), (a') and (h) below:

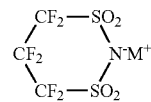
(b)

where $M^+$ denotes any one of $Li^+$, $Na^+$, $K^+$ and $NH_4^+$,

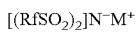
(a)

where Rf denotes any one of $CF_3$, $C_2F_5$, $C_3F_7$ and $C_4F_9$, and $M^+$ denotes any one of $Li^+$, $Na^+$, $K^+$ and $NH_4^+$,

(a')

where Rf denotes any one of $CF_3$, $C_2F_5$, $C_3F_7$ and $C_4F_9$, R denotes a C1-C10 alkyl group, and $M^+$ denotes any one of $Li^+$, $Na^+$, $K^+$ and $NH_4^+$,

(h)

where $M^+$ denotes any one of $Li^+$, $Na^+$, $K^+$ and $NH_4^+$.

<2> The inkjet recording ink according to <1>, wherein the fluorochemical surfactant occupies 0.5% by mass to 5% by mass of the whole of the inkjet recording ink.

<3> The inkjet recording ink according to <1> or <2>, wherein the water-soluble organic solvent is at least one of glycerin and 1,3-butanediol.

<4> The inkjet recording ink according to any one of <1> to <3>, wherein the colorant is contained in fine polymer particles.

<5> The inkjet recording ink according to <4>, wherein the colorant contained in the fine polymer particles is a dye which is at least one of an oil-soluble dye and a disperse dye.

<6> The inkjet recording ink according to any one of <1> to <5>, having a viscosity of 5 mPa·sec to 20 mPa·sec at 25° C.

<7> The inkjet recording ink according to <6>, having a viscosity of 5 mPa·sec to 10 mPa·sec at 25° C.

<8> The inkjet recording ink according to any one of <1> to <7>, having a surface tension of 22 mN/m to 55 mN/m at 20° C.

<9> The inkjet recording ink according to any one of <1> to <8>, having a pH of 7 to 10.

<10> The inkjet recording ink according to any one of <1> to <9>, wherein the colorant has a volume average particle diameter of 77.5 nm to 110.6 nm.

<11> The inkjet recording ink according to any one of <1> to <10>, further including fine resin particles.

<12> An ink cartridge including: a container; and the inkjet recording ink according to any one of <1> to <11>, housed in the container.

<13> An inkjet recording apparatus including: the ink cartridge according to <12> installed therein.

Advantageous Effects of Invention

The present invention makes it possible to provide an inkjet recording ink superior in foaming quality and defoaming quality and favorable in image density, ejection quality and storage stability; an ink cartridge including a container and the inkjet recording ink housed in the container; and an inkjet recording apparatus including the ink cartridge installed therein.

DESCRIPTION OF EMBODIMENTS

The following explains the present invention in detail.
(Inkjet Recording Ink)

An inkjet recording ink of the present invention includes water, a water-soluble organic solvent, a colorant, and any one of fluorochemical surfactants represented by General Formulae (b), (a), (a') and (h) below (hereinafter referred to as "fluorochemical surfactant A"). Note that although compounds represented by General Formula (h) are generally used as surface tension adjusters, they are regarded as fluorochemical surfactants in the present invention.

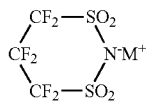 (b)

In General Formula (b), $M^+$ denotes any one of $Li^+$, $Na^+$, $K^+$ and $NH_4^+$.

 (a)

In General Formula (a), Rf denotes any one of $CF_3$, $C_2F_5$, $C_3F_7$ and $C_4F_9$, and $M^+$ denotes any one of $Li^+$, $Na^+$, $K^+$ and $NH_4^+$.

 (a')

In General Formula (a'), Rf denotes any one of $CF_3$, $C_2F_5$, $C_3F_7$ and $C_4F_9$, R denotes a C1-C10 alkyl group, and $M^+$ denotes any one of $Li^+$, $Na^+$, $K^+$ and $NH_4^+$.

 (h)

In General Formula (h), $M^+$ denotes any one of $Li^+$, $Na^+$, $K^+$ and $NH_4^+$.

As described above, when a conventional fluorochemical surfactant is used, there is an improvement in image density and image properties, but there is a problem in that foam is easily generated and is hard to remove.

Meanwhile, the fluorochemical surfactant A has very low foaming properties and does not allow foam to be easily generated, so that even when an anti-foaming agent is not used, foaming of the ink can be reduced and defoaming quality can be improved. Also, since an anti-foaming agent is not required, favorable ink ejection quality and favorable ink storage stability can be secured.

Furthermore, the fluorochemical surfactant A contains no carbon atom bonded to a fluorine atom or contains four or fewer carbon atoms bonded to fluorine atoms, so that neither PFOS nor PFOA is generated as opposed to the case of a conventional fluorochemical surfactant. Thus, no substance which accumulates in human bodies is generated, and so safety can be secured to a great extent. The compounds represented by General Formula (h), in particular, have low molecular weights and move fast to the interface, thereby making it possible to reduce surface tension quickly. Therefore, upon attachment to a medium, the ink quickly spreads in such a manner as to wet the medium, and thus a high-quality image can be formed.

The fluorochemical surfactant A preferably occupies 0.05% by mass to 5% by mass, more preferably 0.5% by mass to 5% by mass, of the whole of the ink. In the case where any of the compounds represented by General Formula (h) is used, it particularly preferably occupies 0.05% by mass to 2% by mass of the whole of the ink. When the fluorochemical surfactant A occupies 0.05% by mass or more, an effect of sufficiently improving ink permeability can be obtained. When the fluorochemical surfactant A occupies 5% by mass or less, increase in viscosity, the occurrence of aggregation, etc., which impairs ink ejection quality, can be prevented in the case where the ink is stored at a high temperature.

The fluorochemical surfactant A may be used solely or in combination with, for example, other fluorochemical surfactant, a nonionic surfactant, an anionic surfactant, an amphoteric surfactant, an acetylene glycol surfactant, etc.

The nonionic surfactant is not particularly limited and may be suitably selected according to the intended purpose. Examples thereof include polyoxyethylene alkyl ethers, polyoxyethylene alkylallyl ethers, polyoxyethylene alkylphenyl ethers, polyoxyethylene glycol esters, polyoxyethylene fatty acid amides, polyoxyethylene fatty acid esters, polyoxyethylene polyoxypropylene glycol, glycerin esters, sorbitan esters, sucrose esters, polyoxyethylene ethers of glycerin esters, polyoxyethylene ethers of sorbitan esters, polyoxyethylene ethers of sorbitol esters, fatty acid alkanolamides, amine oxides, polyoxyethylene alkylamines, glycerin fatty acid esters, sorbitan fatty acid esters, polyoxyethylene sorbitan fatty acid esters and alkyl(poly)glycoxides.

The anionic surfactant is not particularly limited and may be suitably selected according to the intended purpose. Examples thereof include alkylallyl sulfonates, alkylnaphthalene sulfonates, alkyl phosphates, alkyl sulfates, alkyl sulfonates, alkylethersulfates, alkyl sulfosuccinates, alkylestersulfates, alkylbenzenesulfonates, alkyldiphenylether disulfonates, alkylarylether phosphates, alkylarylether sulfates, alkylarylether ester sulfates, olefin sulfonates, alkane olefin sulfonates, polyoxyethylene alkylether phosphates, polyoxyethylene alkylether sulfates, ether carboxylates, sulfosuccinates, α-sulfo fatty acid esters, fatty acid salts, condensation products of higher fatty acids and amino acids, and naphthenates.

The amphoteric surfactant is not particularly limited and may be suitably selected according to the intended purpose. Examples thereof include imidazoline derivatives (such as imidazolinium betaine), dimethyl alkyl lauryl betaines, alkylglycines and alkyldi(aminoethyl)glycines.

The acetylene glycol surfactant is not particularly limited and may be suitably selected according to the intended purpose. Examples thereof include acetylene glycol-based compounds such as 2,4,7,9-tetramethyl-5-decyne-4,7-diol, 3,6-dimethyl-4-octine-3,6-diol and 3,5-dimethyl-1-hexine-3-ol (more specifically, SURFYNOL 104, 82, 465, 485 and TG, manufactured by Air Products and Chemicals, Inc. (USA)).

The colorant is not particularly limited and may be suitably selected according to the intended purpose. For example, a pigment, a dye, colored fine particles, etc. may be used as the colorant.

As the colored fine particles, an aqueous dispersion of fine polymer particles containing a colorant can be suitably used. Here, the expression "fine polymer particles containing a colorant" means either or both of a state in which the colorant is encapsulated in the fine polymer particles, and a state in which the colorant is adsorbed to the surfaces of the fine polymer particles. It should, however, be noted that not all of the colorant needs to be encapsulated in or adsorbed to the fine polymer particles, and that part of the colorant may be directly dispersed in the emulsion as long as effects of the present invention are not impaired.

The colorant used for the colored fine particles is preferably insoluble or sparingly soluble in water and adsorbable to the polymer, and the colorant may be suitably selected according to the intended purpose. Here, the expression "insoluble or sparingly soluble in water" means that the amount of the colorant which can dissolve in 100 parts by mass of water at 20° C. is less than 10 parts by mass. Also, the term "dissolve" means that neither separation nor sedimentation of the colorant at a surface layer or lower layer of the aqueous solution is confirmed when visually observed.

As for the amount of the colored fine particles, the colored fine particles as a solid content preferably occupy 8% by mass to 20% by mass, more preferably 8% by mass to 12% by mass, of the whole of the ink. The colored fine particles in the ink are preferably 0.16 µm or less in average particle diameter.

The colorant used for the colored fine particles is not particularly limited and may be suitably selected according to the intended purpose. For example, a dye (such as a water-soluble dye, an oil-soluble dye or a disperse dye) or a pigment may be used as the colorant. Use of an oil-soluble dye or a disperse dye is preferable in that it can be favorably encapsulated in or adsorbed to the fine polymer particles, whereas use of a pigment is preferable in terms of the light resistance of images obtained. In the case where a water-soluble dye is used, the water-soluble dye preferably dissolves in an organic solvent (e.g. a ketone solvent) at a rate of 2 g/L or greater, more preferably 20 g/L to 600 g/L, in view of efficient impregnation of the fine polymer particles with the water-soluble dye.

The water-soluble dye is not particularly limited and may be suitably selected according to the intended purpose. Suitable examples thereof include dyes classified as acid dyes, direct dyes, basic dyes, reactive dyes and food dyes according to the color index. Among these, preference is given to those which are superior in water resistance and light resistance.

The acid dyes and the food dyes are not particularly limited and may be suitably selected according to the intended purpose. Examples thereof include C.I. Acid Yellow 17, 23, 42, 44, 79 and 142; C.I. Acid Red 1, 8, 13, 14, 18, 26, 27, 35, 37, 42, 52, 82, 87, 89, 92, 97, 106, 111, 114, 115, 134, 186, 249, 254 and 289; C.I. Acid Blue 9, 29, 45, 92 and 249; C.I. Acid Black 1, 2, 7, 24, 26 and 94; C.I. Food Yellow 3 and 4; C.I. Food Red 7, 9 and 14; and C.I. Food Black 1 and 2.

The direct dyes are not particularly limited and may be suitably selected according to the intended purpose. Examples thereof include C.I. Direct Yellow 1, 12, 24, 26, 33, 44, 50, 86, 120, 132, 142 and 144; C.I. Direct Red 1, 4, 9, 13, 17, 20, 28, 31, 39, 80, 81, 83, 89, 225 and 227; C.I. Direct Orange 26, 29, 62 and 102; C.I. Direct Blue 1, 2, 6, 15, 22, 25, 71, 76, 79, 86, 87, 90, 98, 163, 165, 199 and 202; and C.I. Direct Black 19, 22, 32, 38, 51, 56, 71, 74, 75, 77, 154, 168 and 171.

The basic dyes are not particularly limited and may be suitably selected according to the intended purpose. Examples thereof include C.I. Basic Yellow 1, 2, 11, 13, 14, 15, 19, 21, 23, 24, 25, 28, 29, 32, 36, 40, 41, 45, 49, 51, 53, 63, 64, 65, 67, 70, 73, 77, 87 and 91; C.I. Basic Red 2, 12, 13, 14, 15, 18, 22, 23, 24, 27, 29, 35, 36, 38, 39, 46, 49, 51, 52, 54, 59, 68, 69, 70, 73, 78, 82, 102, 104, 109 and 112; C.I. Basic Blue 1, 3, 5, 7, 9, 21, 22, 26, 35, 41, 45, 47, 54, 62, 65, 66, 67, 69, 75, 77, 78, 89, 92, 93, 105, 117, 120, 122, 124, 129, 137, 141, 147 and 155; and C.I. Basic Black 2 and 8.

The reactive dyes are not particularly limited and may be suitably selected according to the intended purpose. Examples thereof include C.I. Reactive Black 3, 4, 7, 11, 12 and 17; C.I. Reactive Yellow 1, 5, 11, 13, 14, 20, 21, 22, 25, 40, 47, 51, 55, 65 and 67; C.I. Reactive Red 1, 14, 17, 25, 26, 32, 37, 44, 46, 55, 60, 66, 74, 79, 96 and 97; and C.I. Reactive Blue 1, 2, 7, 14, 15, 23, 32, 35, 38, 41, 63, 80 and 95.

The pigment is not particularly limited and may be suitably selected from a variety of inorganic pigments and organic pigments, according to the intended purpose.

The inorganic pigments are not particularly limited and may be suitably selected according to the intended purpose. Examples thereof include titanium oxide, iron oxide, calcium carbonate, barium sulfate, aluminum hydroxide, barium yellow, cadmium red, chrome yellow and carbon blacks. Among these, carbon blacks are preferable. Parenthetically, examples of the carbon blacks include those manufactured by methods known in the art, such as contact method, furnace method and thermal method.

The organic pigments are not particularly limited and may be suitably selected according to the intended purpose. Examples thereof include azo pigments, polycyclic pigments, dye chelates, nitro pigments, nitroso pigments and aniline black. Among these, azo pigments and polycyclic pigments are particularly preferable. Examples of the azo pigments include azo lakes, insoluble azo pigments, condensed azo pigments and chelated azo pigments. Examples of the polycyclic pigments include phthalocyanine pigments, perylene pigments, perinone pigments, anthraquinone pigments, quinacridone pigments, dioxadine pigments, indigo pigments, thioindigo pigments, isoindolinone pigments and quinophthalone pigments. Examples of the dye chelates include basic dye chelates and acid dye chelates.

The color of the pigment is not particularly limited, and the pigment may be suitably selected from black pigments and color pigments according to the intended purpose. These pigments may be used individually or in combination.

Examples of black pigments include carbon blacks (C.I. Pigment Black 7) such as furnace black, lamp black, acetylene black and channel black; metals such as copper, iron (C.I. Pigment Black 11) and titanium oxide; and organic pigments such as aniline black (C.I. Pigment Black 1).

Examples of color pigments for yellow include C.I. Pigment Yellow 1 (Fast Yellow G), 3, 12 (Disazo Yellow AAA), 13, 14, 17, 23, 24, 34, 35, 37, 42 (yellow iron oxide), 53, 55, 74, 81, 83 (Disazo Yellow HR), 95, 97, 98, 100, 101, 104, 108, 109, 110, 117, 120, 128, 138, 150 and 153.

Examples of color pigments for magenta include C.I. Pigment Red 1, 2, 3, 5, 17 and 22 (Brilliant Fast Scarlet), 23, 31, 38, 48:2 (Permanent Red 2B (Ba)), 48:2 (Permanent Red 2B (Ca)), 48:3 (Permanent Red 2B (Sr)), 48:4 (Permanent Red 2B (Mn)), 49:1, 52:2, 53:1, 57:1 (Brilliant Carmine 6B), 60:1, 63:1, 63:2, 64:1, 81 (Rhodamine 6G Lake), 83, 88, 92, 101 (red ochre), 104, 105, 106, 108 (cadmium red), 112, 114, 122 (dimethylquinacridone), 123, 146, 149, 166, 168, 170, 172, 177, 178, 179, 185, 190, 193, 209 and 219.

Examples of color pigments for cyan include C.I. Pigment Blue 1, 2, 15 (Copper Phthalocyanine Blue R), 15:1, 15:2, 15:3 (Copper Phthalocyanine Blue G), 15:4, 15:6 (Phthalocyanine Blue E), 16, 17:1, 56, 60 and 63. Examples of color pigments for red, green and blue as intermediate colors include C.I. Pigment Red 177, 194 and 224; C.I. Pigment Orange 43, C.I. Pigment Violet 3, 19, 23 and 37; and C.I. Pigment Green 7 and 36.

The pigment is not particularly limited and may be suitably selected according to the intended purpose. The pigment is preferably a self-dispersible color pigment which includes at least one hydrophilic group bonded to the pigment surface directly or via other atomic group and which can thus be stably dispersed without using a dispersant. In this case, a dispersant for dispersing the pigment is not required.

The self-dispersible color pigment preferably has ionic properties. As this pigment, a pigment anionically charged by introduction of an anionic hydrophilic group or a pigment cationically charged by introduction of a cationic hydrophilic group is suitable.

Examples of the anionic hydrophilic group include —COOM, —SO$_3$M, —PO$_3$HM, —PO$_3$M$_2$, —SO$_2$NH$_2$ and —SO$_2$NHCOR (in these formulae, M denotes a hydrogen atom, an alkali metal, an ammonium or an organic ammonium, and R denotes a C1-C12 alkyl group, a phenyl group which may contain a substituent, or a naphthyl group which may contain a substituent). In particular, use of a color pigment with —COOM or —SO$_3$M bonded to the color pigment surface is preferable. Examples of the alkali metal denoted by M include lithium, sodium and potassium. Examples of the organic ammonium include monomethylammonium, dimethylammonium, trimethylammonium, monoethylammonium, diethylammonium, triethylammonium, monomethanolammonium, dimethanolammonium and trimethanolammonium.

Examples of methods for obtaining the anionically charged color pigment, which involve introducing —COONa to the color pigment surface, include a method of oxidizing the color pigment with sodium hypochlorite, a method of sulfonating the color pigment, and a method of reacting the color pigment with a diazonium salt.

Preferred examples of the cationic hydrophilic group include quaternary ammonium groups. A color pigment with any of these groups bonded to the color pigment surface is particularly suitable as the colorant.

In the present invention, a black pigment prepared by bonding any of the hydrophilic groups to the surface of carbon black via other atomic group can be suitably used as well. Examples of the other atomic group include C1-C12 alkyl groups, a phenyl group which may contain a substituent, and a naphthyl group which may contain a substituent. Specific examples of the black pigment prepared by bonding any of the hydrophilic groups to the surface of carbon black via other atomic group include, but are not limited to, —C$_2$H$_4$COOM (M denotes an alkali metal or a quaternary ammonium), -PhSO$_3$M (Ph denotes a phenyl group, and M denotes an alkali metal or a quaternary ammonium) and —C$_5$H$_{10}$NH$_3$$^+$.

In the present invention, a pigment dispersion liquid containing a pigment dispersant may be used as well.

Preferred examples of the pigment dispersant include hydrophilic polymers, or more specifically, natural hydrophilic polymers, semisynthetic hydrophilic polymers and purely synthetic hydrophilic polymers.

Examples of the natural hydrophilic polymers include vegetable polymers such as gum arabic, gum tragacanth, guar gum, karaya gum, locust bean gum, arabinogalactan, pectin and quince seed starch; seaweed polymers such as alginic acid, carrageenan and agar; animal polymers such as gelatin, casein, albumin and collagen; and microbial polymers such as xanthene gum and dextran.

Examples of the semisynthetic hydrophilic polymers include cellulose polymers such as methyl cellulose, ethyl cellulose, hydroxyethyl cellulose, hydroxypropyl cellulose and carboxymethyl cellulose; starch polymers such as sodium starch glycolate and sodium starch phosphate; and seaweed polymers such as sodium alginate and propylene glycol alginate ester.

Examples of the purely synthetic hydrophilic polymers include vinyl polymers such as polyvinyl alcohol, polyvinyl pyrrolidone and polyvinyl methyl ether; acrylic resins such as non-crosslinked polyacrylamide, polyacrylic acid, alkali metal salts of polyacrylic acid, and water-soluble styrene-acrylic resins; water-soluble styrene-maleic acid resins, water-soluble vinylnaphthalene-acrylic resins, water-soluble vinylnaphthalene-maleic acid resins, polyvinyl pyrrolidone, polyvinyl alcohol, alkali metal salts of β-naphthalenesulfonic acid formalin condensates, and polymer compounds having salts with cationic functional groups (such as quaternary ammonium groups and amino groups) in side chains; and natural polymer compounds such as shellac.

Particularly preferable as polymer dispersants among these are compounds into which carboxylic acid groups have been introduced, for example homopolymers of acrylic acid, methacrylic acid and styrene-acrylic acid, and copolymers of other hydrophilic group-containing monomers.

It is preferred that these copolymers each have a mass average molecular weight of 3,000 to 50,000, more preferably 5,000 to 30,000, even more preferably 7,000 to 15,000.

The mixture mass ratio of the pigment to the dispersant (pigment:dispersant) is preferably in the range of 1:0.06 to 1:3, more preferably 1:0.125 to 1:3.

The pigment preferably occupies 0.5% by mass to 25% by mass, more preferably 2% by mass to 15% by mass, of the whole of the ink. Generally, as the pigment concentration increases, the image density increases and thus the image quality improves, but adverse effects easily arise on fixing properties, ejection quality, and reliability (for example, in terms of prevention of clogging). However, the ink of the present invention makes it possible to secure favorable fixing properties while maintaining ejection quality, and reliability (for example, in terms of prevention of clogging), even if the amount of the pigment is large.

In the ink of the present invention, water is used as a liquid medium; in addition, a water-soluble organic solvent is used for the purposes of allowing the ink to have desired properties, preventing the ink from drying, improving the dissolution stability of the ink, and so forth. Examples of the water-soluble organic solvent include the following.

Polyhydric alcohols such as ethylene glycol, diethylene glycol, triethylene glycol, tetraethylene glycol, polyethylene glycol, propylene glycol, dipropylene glycol, tripropylene glycol, polypropylene glycol, 1,3-propanediol, 1,3-butanediol, 1,4-butanediol, 2,3-butanediol, 3-methyl-1,3-butanediol, 1,5-pentanediol, 2-methyl-2,4-pentanediol, 3-methyl-1,5-pentanediol, 1,6-hexanediol, thiodiglycol, glycerin, 1,2,3-butanetriol, 1,2,4-butanetriol, 1,2,6-hexanetriol and petriol Alkyl ethers of polyhydric alcohols, such as ethylene glycol monoethyl ether, ethylene glycol monobutyl ether, diethylene glycol monomethyl ether, diethylene glycol monoethyl ether, diethylene glycol monobutyl ether, tetraethylene glycol monomethyl ether and propylene glycol monoethyl ether Aryl ethers of polyhydric alcohols, such as ethylene glycol monophenyl ether and ethylene glycol monobenzyl ether Nitrogen-containing heterocyclic compounds such as 2-pyrrolidone, N-methyl-2-pyrrolidone, N-hydroxyethyl-2-pyrrolidone, 1,3-dimethylimidazolidinone and ε-caprolactam Amides such as formamide, N-methylformamide and N,N-dimethylformamide Amines such as monoethanol amine, diethanol amine, triethanol amine, monoethylamine, diethylamine and triethylamine Sulfur-containing compounds such as dimethyl sulfoxide, sulforane and thiodiethanol Propylene carbonate, ethylene carbonate and γ-butyrolactone These water-soluble organic solvents may be used individually or in combination, and suitably selected water-soluble organic solvent(s) is/are used together with the water.

Preferable among these water-soluble organic solvents are glycerin, ethylene glycol, diethylene glycol, triethylene glycol, tetraethylene glycol, polyethylene glycol, propylene glycol, dipropylene glycol, tripropylene glycol, 1,3-butanediol, 1,4-butanediol, 2,3-butanediol, 3-methyl-1,3-butanediol, 1,5-pentanediol, 2-methyl-2,4-pentanediol, 3-methyl-1,5-pentanediol, 1,6-hexanediol, 1,2,4-butanetriol, 1,2,6-hexanetriol, thiodiglycol, 2-pyrrolidone, N-methyl-2-pyrrolidone and N-hydroxyethyl-2-pyrrolidone. Particularly preferable among these water-soluble organic solvents are 1,3-butanediol, 3-methyl-1,3-butanediol, 2-methyl-2,4-pentanediol and 3-methyl-1,5-pentanediol.

The water-soluble organic solvent preferably occupies 10% by mass to 50% by mass, more preferably 20% by mass to 40% by mass, of the whole of the ink.

If necessary, the ink of the present invention may further include other water-soluble organic solvent(s) besides the above-mentioned water-soluble organic solvent. Preferred examples of the other water-soluble organic solvent(s) include sugars.

Examples of the sugars include monosaccharides, disaccharides, oligosaccharides (including trisaccharides and tetrasaccharides), polysaccharides, and derivatives of these sugars. Suitable specific examples thereof include glucose, mannose, fructose, ribose, xylose, arabinose, galactose, maltose, cellobiose, lactose, sucrose, trehalose and maltotriose. Here, the term "polysaccharides" means sugars in a broad sense, including substances which widely exist in nature, such as α-cyclodextrin and cellulose.

Examples of the derivatives of the sugars include reducing sugars (such as sugar alcohols represented by the general formula $HOCH_2(CHOH)nCH_2OH$, where n denotes an integer of 2 to 5), oxidizing sugars (such as aldonic acids and uronic acids), amino acids and thio acids. Among these, sugar alcohols are particularly preferable. Specific examples of the sugar alcohols include maltitol and sorbit.

It is preferred that any of the sugars occupy 0.1% by mass to 40% by mass, more preferably 0.5% by mass to 30% by mass, of the whole of the ink.

The ink of the present invention may also include fine resin particles.

Fine resin particles have a thickening and aggregating nature and produce effects of suppressing permeation of coloring components and promoting fixation of the ink to a recording material. Also, fine resin particles form a coating film over a recording material depending upon the type of the fine resin particles, thereby producing an effect of improving the rub resistance of printed matter.

The fine resin particles are not particularly limited and may be suitably selected according to the intended purpose. Suitable examples thereof include fine particles of a silicone-modified acrylic resin obtained by polymerization of an acrylic monomer and a silane compound in the presence of an emulsifier.

Examples of the acrylic monomer include acrylic acid ester monomers, methacrylic acid ester monomers, amide acrylates, and carboxylic acid-containing monomers.

Specific examples of the acrylic acid ester monomers include methyl acrylate, ethyl acrylate, butyl acrylate, acrylic acid-2-ethylhexyl, 2-hydroxyethyl acrylate, acryloylmorpholine and N,N-dimethylaminoethyl acrylate.

Specific examples of the methacrylic acid ester monomers include methyl methacrylate, ethyl methacrylate, butyl methacrylate, methacrylic acid-2-ethylhexyl, 2-hydroxyethyl methacrylate and N,N-dimethylaminoethyl methacrylate.

Examples of the amide acrylates include N-methylolacrylamide and methoxymethylacrylamide.

Examples of the carboxylic acid-containing monomers include maleic acid, fumaric acid, itaconic acid, acrylic acid and methacrylic acid.

The silane compound is not particularly limited and may be suitably selected according to the intended purpose. Examples thereof include tetramethoxysilane, methyltrimethoxysilane, dimethyldimethoxysilane, phenyltrimethoxysilane, diphenyldimethoxysilane, tetraethoxysilane, methyltriethoxysilane, dimethyldiethoxysilane, phenyltriethoxysilane, diphenyldiethoxysilane, hexyltrimethoxysilane, hexyltriethoxysilane, decyltrimethoxysilane, decyltriethoxysilane and trifluoropropyltrimethoxysilane.

Also, monomers generally known as silane coupling agents are usable as the silane compound.

Specific examples of such monomers include vinyltrichlorosilane, vinyltrimethoxysilane, vinyltriethoxysilane, p-styryltrimethoxysilane, 3-methacryloxypropylmethyldimethoxysilane, 3-methacryloxypropyltrimethoxysilane, 3-methacryloxypropylmethyldiethoxysilane, 3-methacryloxypropyltriethoxysilane, 3-acryloxypropyltrimethoxysilane, N-2-(aminoethyl)-3-aminopropylmethyldimethoxysilane, N-2-(aminoethyl)-3-aminopropyltrimethoxysilane, N-2-(aminoethyl)-3-aminopropyltriethoxysilane, 3-aminopropyltrimethoxysilane, 3-aminopropyltriethoxysilane, 3-triethoxysilyl-N-(1,3-dimethyl-butyliden)propylamine, N-phenyl-3-aminopropyltrimethoxysilane, N-(vinylbenzyl)-2-aminoethyl-3-aminopropyltrimethoxysilane hydrochloride, 3-ureidopropyltriethoxysilane, 3-chloropropyltrimethoxysilane, 3-mercaptopropylmethyldimethoxysilane, 3-mercaptopropyltrimethoxysilane, bis(triethoxysilylpropyl)tetrasulfide and 3-isocyanatepropyltriethoxysilane.

The silane compound may contain a hydrolyzable silyl group. Here, the term "hydrolyzable silyl group" means a silyl group containing a group which can easily be hydrolyzed (hereinafter, this group will also be referred to simply as "hydrolyzable group").

Examples of the hydrolyzable group include alkoxy groups, mercapto groups, halogen groups, amide groups, acetoxy groups, amino groups and isopropenoxy groups.

The silyl group changes to a silanol group by hydrolysis, then the silanol group undergoes dehydration condensation, and a siloxane bond is thus produced. Here, it is preferred that the hydrolyzable silyl group undergo polymerization reaction and hydrolysis, and thereby disappear. If the hydrolyzable silyl group remains, the storage quality of the ink may degrade.

The emulsifier is not particularly limited and may be suitably selected according to the intended purpose. Examples thereof include alkylbenzenesulfonic acids and salts thereof, dialkylsulfosuccinic acid esters and salts thereof, formalin condensates of alkyl naphthalene sulfonates, higher fatty acid salts, sulfonates of higher fatty acid esters, polyoxypropylene-polyoxyethylene condensates of ethylenediamine, sorbitan fatty acid esters and salts thereof, aromatic/aliphatic phosphoric acid esters and salts thereof, dodecylbenzene sulfonates, dodecyl sulfates, lauryl sulfates, dialkylsulfosuccinates, polyoxyethylene alkylphenyl ether sulfates, polyoxyethylene alkylpropenylphenyl ether sulfates, alkylphenyl ether disulfonates, polyoxyethylene alkyl phosphates, polyoxyethylene alkyl ether acetates, polyoxyethylene lanolin alcohol ethers, polyoxyethylene lanolin fatty acid esters, lauryl alcohol ethoxylates, lauryl ether sulfates, lauryl ether phosphoric acid esters, sorbitan fatty acid esters, fatty acid diethanol amides, and formalin condensates of naphthalenesulfonic acid.

Examples of the salts include sodium salts and ammonium salts.

Examples of the emulsifier also include reactive emulsifiers each containing unsaturated double bond(s).

Examples of the reactive emulsifiers as commercially available products include ADEKA REASOAP SE, NE and PP (manufactured by Asahi Denka Co., Ltd.), LATEMUL S-180 (manufactured by Kao Corporation), ELEMINOL JS-2 and ELEMINOL RS-30 (manufactured by Sanyo Chemical Industries, Ltd.) and AQUARON RN-20 (manufactured by DAI-ICHI KOGYO SEIYAKU CO., LTD.).

The fine resin particles preferably have a volume average particle diameter of 10 nm to 300 nm, more preferably 40 nm to 200 nm. When the fine resin particles have a volume average particle diameter of 10 nm or greater, difficulty in adjusting the ink viscosity such that the ink can be ejected by a printer (caused by an excessive increase in the viscosity of the resin emulsion) can be prevented. When the fine resin particles have a volume average particle diameter of 300 nm or less, ink ejection failure (caused by clogging of a nozzle with particles in a printer) can be prevented.

The amount of the silicone in the silicone-modified acrylic resin is preferably in the range of 100 ppm to 400 ppm. When the amount of the silicone is 100 ppm or greater, a coating film superior in rub resistance and marker resistance can be obtained. When the amount of the silicone is 400 ppm or less, decrease in its stability in the ink (caused by an excessive increase in hydrophobicity) can be prevented.

The minimum film forming temperature of the silicon-modified acrylic resin is preferably 20° C. or lower. When the minimum film forming temperature is 20° C. or lower, sufficient fixing properties can be obtained. Specifically, even when a printed portion is rubbed or a marker is moved over the printed portion, for example, smearing of a printed medium (caused by separation of the pigment) can be prevented.

If necessary, the ink of the present invention may further include a urea-based substance or an alkylglycine. Basically, both of these (when used in an aqueous ink) enable favorable moistness to be retained (which leads to an improvement in storage stability) and produce favorable effects on the ejection quality and clogging resistance of a recording head of an inkjet printer. Also, since its inclusion in the ink enables wider adaptability to adjustment of the viscosity and surface tension of the ink and yields superior clogging resistance, it is possible to effectively prevent clogging of the head and ejection failure (such as flight of ink droplets in a curved manner) in ink ejection.

Examples of the urea-based substance include urea, thiourea, ethylene urea and 1,3-dimethyl-2-imidazolidinone. Examples of the alkylglycine include N-methylglycine, N,N-dimethylglycine and N-ethylglycine.

In general, the urea-based substance or the alkylglycine preferably occupies 0.5% by mass to 50% by mass, more preferably 1% by mass to 20% by mass, of the whole of the ink. When it occupies 0.5% by mass or more, required properties of a desired inkjet printer recording head can be satisfied. When it occupies 50% by mass or less, ejection failure of the ink and adverse effects on the storage stability of the ink (caused by thickening of the ink) can be prevented.

If necessary, the ink of the present invention may further include an antiseptic/antimold agent, a pH adjuster, an antirust agent, an antioxidant, an ultraviolet absorber, an oxygen absorber, a light stabilizer, etc. besides the above-mentioned components.

Examples of the antiseptic/antimold agent include 1,2-benzisothiazolin-3-one, sodium dehydroacetate, sodium sorbate, sodium 2-pyridinethiol-1-oxide, sodium benzoate and sodium pentachlorophenol.

The pH adjuster is not particularly limited as long as it can adjust the pH of the ink to 7 or higher without having an adverse effect on the ink, and it may be suitably selected according to the intended purpose.

Examples thereof include amines such as diethanolamine and triethanolamine; hydroxides of alkali metals, such as lithium hydroxide, sodium hydroxide and potassium hydroxide; ammonium hydroxide, quaternary ammonium hydroxides, and quaternary phosphonium hydroxides; and carbonates of alkali metals, such as lithium carbonate, sodium carbonate and potassium carbonate.

Examples of the antirust agent include acid sulfites, sodium thiosulfate, ammonium thiodiglycolate, diisopropylammonium nitrite, pentaerythritol tetranitrate and dicyclohexylammonium nitrite.

Examples of the antioxidant include phenolic antioxidants (including hindered phenolic antioxidants), amine antioxidants, sulfur antioxidants and phosphate antioxidants.

Specific examples of the phenolic antioxidants (including hindered phenolic antioxidants) include butylated hydroxyanisole, 2,6-di-tert-butyl-4-ethylphenol, stearyl-β-(3,5-di-tert-butyl-4-hydroxyphenyl)propionate, 2,2'-methylenebis (4-methyl-6-tert-butylphenol), 2,2'-methylenebis(4-ethyl-6-tert-butylphenol), 4,4'-butylidenebis(3-methyl-6-tert-butylphenol), 3,9-bis[1,1-dimethyl-2-[β-(3-tert-butyl-4-hydroxy-5-methylphenyl)propionyloxy]-ethyl]-2,4,8,10-tetraoxaspiro[5,5]undecane, 1,1,3-tris(2-methyl-4-hydroxy-5-tert-butylphenyl)butane, 1,3,5-trimethyl-2,4,6-tris(3,5-di-tert-butyl-4-hydroxybenzyl)benzene and tetrakis[methylene-3-(3',5'-di-tert-butyl-4'-hydroxyphenyl)propionate]methane.

Examples of the amine antioxidants include phenyl-β-naphthylamine, α-naphthylamine, N,N'-di-sec-butyl-p-phenylenediamine, phenothiazine, N,N'-diphenyl-p-phenylenediamine, 2,6-di-tert-butyl-p-cresol, 2,6-di-tert-butylphenol, 2,4-dimethyl-6-tert-butyl-phenol, butylhydroxyanisol, 2,2'-methylenebis(4-methyl-6-tert-butylphenol), 4,4'-butylidenebis(3-methyl-6-tert-butylphenol), 4,4'-thiobis(3-methyl-6-tert-butylphenol), tetrakis[methylene-3-(3,5-di-tert-butyl-4-dihydroxyphenyl)propionate]methane and 1,1,3-tris (2-methyl-4-hydroxy-5-tert-butylphenyl)butane.

Examples of the sulfur antioxidants include dilauryl-3,3'-thiodipropionate, distearyl thiodipropionate, laurylstearyl thiodipropionate, dimyristyl-3,3'-thiodipropionate, distearyl β,β'-thiodipropionate, 2-mercaptobenzoimidazole and dilauryl sulfide.

Examples of the phosphate antioxidants include triphenyl phosphite, octadecyl phosphite, triisodecyl phosphite, trilauryl trithiophosphite and trinonylphenyl phosphite.

Examples of the ultraviolet absorber include benzophenone ultraviolet absorbers, benzotriazole ultraviolet absorbers, salicylate ultraviolet absorbers, cyanoacrylate ultraviolet absorbers and nickel complex salt ultraviolet absorbers.

Specific examples of the benzophenone ultraviolet absorbers include 2-hydroxy-4-n-octoxybenzophenone, 2-hydroxy-4-n-dodecyloxybenzophenone, 2,4-dihydroxybenzophenone, 2-hydroxy-4-methoxy-benzophenone and 2,2',4,4'-tetrahydroxybenzophenone.

Specific examples of the benzotriazole ultraviolet absorbers include 2-(2'-hydroxy-5'-tert-octylphenyl)benzotriazole, 2-(2'-hydroxy-5'-methylphenyl)benzotriazole, 2-(2'-hydroxy-4'-octoxyphenyl)benzotriazole and 2-(2'-hydroxy-3'-tert-butyl-5'-methylphenyl)-5-chlorobenzotriazole.

Specific examples of the salicylate ultraviolet absorbers include phenyl salicylate, p-tert-butylphenyl salicylate and p-octylphenyl salicylate.

Specific examples of the cyanoacrylate ultraviolet absorbers include ethyl-2-cyano-3,3'-diphenylacrylate, methyl-2-cyano-3-methyl-3-(p-methoxyphenyl)acrylate and butyl-2-cyano-3-methyl(p-methoxyphenyl)acrylate.

Specific examples of the nickel complex salt ultraviolet absorbers include nickel bis(octylphenyl)sulfide, 2,2'-thiobis(4-tert-octylferrate)-n-butylamine nickel(II), 2,2'-thiobis(4-tert-octylferrate)-2-ethylhexylamine nickel(II) and 2,2'-thiobis(4-tert-octylferrate)triethanolamine nickel(II).

The properties of the ink of the present invention are not particularly limited and may be suitably selected according to the intended purpose. However, the viscosity of the ink at 25° C. is preferably in the range of 5 mPa·sec to 20 mPa·sec, more preferably 5 mPa·sec to 10 mPa·sec. When the viscosity at 25° C. is 20 mPa·sec or less, favorable ink ejection quality can be secured without difficulty.

Also, the surface tension of the ink at 20° C. is preferably in the range of 22 mN/m to 55 mN/m. When the surface tension at 20° C. is 22 mN/m or greater, bleeding on paper does not become noticeable, and the ink is stably jetted. When the surface tension at 20° C. is 55 mN/m or less, permeation of the ink through paper is not insufficient, and the time required for drying does not lengthen.

Also, the ink preferably has a pH of 7 to 10.

(Ink Cartridge)

An ink cartridge of the present invention includes a container; and the inkjet recording ink of the present invention, housed in the container.

(Inkjet Recording Apparatus)

An inkjet recording apparatus of the present invention includes the ink cartridge installed therein. This inkjet recording apparatus can be suitably used for various types of recording performed by inkjet recording methods. For example, the inkjet recording apparatus can be particularly suitably used as an inkjet recording printer, a facsimile apparatus, a copier, a printer-facsimile-copier complex machine, etc.

EXAMPLES

The following explains the present invention more specifically, referring to Examples and Comparative Examples. It should, however, be noted that the scope of the present invention is not confined to these Examples.

Preparation Example 1

Preparation of Cyan Pigment Dispersion

A cyan pigment dispersion was prepared in the following manner, referring to Preparation Example 3 in Japanese Patent (JP-B) No. 4138214.

First of all, the atmosphere inside a 1 L flask equipped with a mechanical stirrer, a thermometer, a nitrogen gas introducing pipe, a reflux tube and a dripping funnel was adequately replaced by nitrogen gas, then 11.2 g of styrene, 2.8 g of acrylic acid, 12.0 g of lauryl methacrylate, 4.0 g of polyethylene glycol methacrylate, 4.0 g of a styrene macromer (product name: AS-6, manufactured by Toagosei Co., Ltd.) and 0.4 g of mercaptoethanol were placed in the flask, and the temperature was raised to 65° C.

Next, there was prepared a mixed solution of 100.8 g of styrene, 25.2 g of acrylic acid, 108.0 g of lauryl methacrylate, 36.0 g of polyethylene glycol methacrylate, 60.0 g of hydroxyethyl methacrylate, 36.0 g of a styrene macromer (product name: AS-6, manufactured by Toagosei Co., Ltd.), 3.6 g of mercaptoethanol, 2.4 g of azobisdimethylvaleronitrile and 18 g of methyl ethyl ketone, and this mixed solution was poured dropwise into the flask in 2.5 hours.

After the mixed solution had finished being poured dropwise, a mixed solution of 0.8 g of azobisdimethylvaleronitrile and 18 g of methyl ethyl ketone was applied dropwise into the flask in 0.5 hours. The ingredients were aged at 65° C. for 1 hour, then 0.8 g of azobisdimethylvaleronitrile was added, and further, the ingredients were aged for 1 hour.

After the reaction had finished, 364 g of methyl ethyl ketone was poured into the flask, and 800 g of a polymer solution having a concentration of 50% by mass was thus obtained. Part of this polymer solution was dried. The mass average molecular weight of this partly dried polymer solution, measured by gel permeation chromatography (standard: polystyrene, solvent: tetrahydrofuran), was 15,000.

Next, 28 g of the polymer solution, 26 g of a copper phthalocyanine pigment (C.I. Pigment Cyan 15:3), 13.6 g of 1 mol/L potassium hydroxide solution, 20 g of methyl ethyl ketone and 30 g of ion-exchange water were sufficiently stirred and mixed, then the ingredients were kneaded 20 times using a triple roll mill (product name: NR-84A, manufactured by Noritake Co., Limited).

The obtained paste was poured into 200 g of ion-exchange water, which was followed by sufficient stirring. Thereafter, the methyl ethyl ketone and the water were distilled away using an evaporator, and 160 g of a blue fine polymer particle dispersion having a solid content of 20.0% by mass was obtained.

The average particle diameter (D 50%) of the obtained fine polymer particles, measured using a particle size distribution measuring apparatus (MICROTRACK UPA, manufactured by NIKKISO CO., LTD.), was 93 nm.

Preparation Example 2

Preparation of Magenta Pigment Dispersion

The same process as in Preparation Example 1 was carried out except that C.I. Pigment Red 122 was used instead of the copper phthalocyanine pigment. A purplish red fine polymer particle dispersion was thus obtained.

The average particle diameter (D 50%) of the obtained fine polymer particles, measured as in Preparation Example 1, was 127 nm.

Preparation Example 3

Preparation of Yellow Pigment Dispersion

The same process as in Preparation Example 1 was carried out except that C.I. Pigment Yellow 74 was used instead of the copper phthalocyanine pigment. A yellow fine polymer particle dispersion was thus obtained.

The average particle diameter (D 50%) of the obtained fine polymer particles, measured as in Preparation Example 1, was 76 nm.

Preparation Example 4

Preparation of Black Pigment Dispersion

Into 3,000 mL of 2.5 N (normal) sodium sulfate solution, 90 g of carbon black having a CTAB specific surface area of 150 m²/g and having a DBP oil absorption of 100 mL/100 g was added, then the mixture was stirred at a temperature of 60° C. and a rotational speed of 300 rpm and subjected to reaction for 10 hours, and the carbon black was thus oxidized.

This reaction solution was filtered, then the carbon black having been filtered out was neutralized with a sodium hydroxide solution and subsequently subjected to ultrafiltration. Further, the obtained carbon black was washed with water and dried, then dispersed into purified water such that the pigment concentration was 20% by mass.

In this manner, a surface-treated carbon black pigment dispersion was prepared.

The average particle diameter (D 50%) of the obtained carbon black pigment dispersion, measured as in Preparation Example 1, was 99 nm.

Examples 1 to 12 and Comparative Examples 1 to 10

In each of Examples 1 to 12 and Comparative Examples 1 to 10, the materials shown in "Composition of ink" in Table 1 or 2 were mixed, then a sodium hydroxide (10% by mass) aqueous solution was used to adjust the pH to 9.

Subsequently, the obtained solution was filtered through a membrane filter of 0.8 μm in average pore diameter. Inks of Examples 1 to 12 and Comparative Examples 1 to 10 were thus obtained.

The values written in relation to the materials in Tables below are based upon percent by mass. Also, details of the materials shown in Tables below are as follows.

Organic solvent A: glycerin
Organic solvent B: 1,3-butanediol
Surfactant A: fluorochemical surfactant A-1 represented by General Formula (b) (potassium salt)
Surfactant A: fluorochemical surfactant A-2 represented by General Formula (b) (sodium salt)
Surfactant A: fluorochemical surfactant A-3 represented by General Formula (b) (lithium salt)
Surfactant A: fluorochemical surfactant A-4 represented by General Formula (b) (ammonium salt)
Surfactant B: fluorochemical surfactant ZONYL FS300 (manufactured by E. I. du Pont de Nemours and Company), active ingredient: 40% by mass
Surfactant C: alcoholic surfactant SOFTANOL EP7025 (manufactured by NIPPON SHOKUBAI CO., LTD.)
Anti-foaming agent: silicone anti-foaming agent KM-72F (manufactured by Shin-Etsu Chemical Co., Ltd.)
Water: ion-exchange water Characteristics of the inks of Examples 1 to 12 and Comparative Examples 1 to 10 were evaluated as follows. The results are shown in Tables 3 and 4.

<Test of Foaming>

Into 100 mL of a graduated cylinder, 10 mL of each ink was poured at 10° C. Then air was injected into the ink, and the air injection was stopped when the total volume of the ink and air bubbles became 100 mL.

The length of time between the start of the air injection and the cessation of the air injection was defined as the time of foaming. The length of time between the cessation of the air injection and the time when the total volume of the ink and air bubbles became 20 mL was defined as the time of defoaming. Evaluations were carried out based upon the following criteria.

(Foaming Quality)
A: The time of foaming was 15 seconds or more.
B: The time of foaming was 10 seconds or more, but less than 15 seconds.
C: The time of foaming was 5 seconds or more, but less than 10 seconds.
D: The time of foaming was less than 5 seconds.

(Defoaming Quality)
A: The time of defoaming was less than 600 seconds.
B: The time of defoaming was 600 seconds or more, but less than 1,200 seconds.
C: The time of defoaming was 1,200 seconds or more, but less than 1,800 seconds.
D: The time of defoaming was 1,800 seconds or more.

<Image Density>

Using an inkjet printer (IPSIO GX-5000, manufactured by Ricoh Company, Ltd.) in an environment where the temperature and the relative humidity were adjusted to 23° C. and 50% respectively, the drive voltage of a piezoelectric element was changed such that the ink ejection amount is uniform, and the amount of the ink attached to each recording medium was thus equalized.

Subsequently, a chart including a "black square" of 64 pt. in size produced using MICROSOFT WORD 2000 was printed onto the paper Xerox 4024 (manufactured by Fuji Xerox Co., Ltd.). The colorimetric value of the "black square" was measured using the densitometer X-RITE 938, and judgments were made based upon the following evaluation criteria.

As for the printing mode used, the "plain paper—standard, quick" mode with "no color modification" was selected in the user's setting for plain paper, using a driver accompanying the printer.

(Evaluation Criteria)
A: OD (optical density) value
  Black: 1.30 or greater
  Yellow: 0.85 or greater
  Magenta: 0.95 or greater
  Cyan: 1.10 or greater
B: OD value
  Black: 1.20 or greater, but less than 1.30
  Yellow: 0.80 or greater, but less than 0.85
  Magenta: 0.90 or greater, but less than 0.95
  Cyan: 1.00 or greater, but less than 1.10
C: OD value
  Black: 1.10 or greater, but less than 1.20
  Yellow: 0.70 or greater, but less than 0.80
  Magenta: 0.80 or greater, but less than 0.90
  Cyan: 0.90 or greater, but less than 1.00
D: OD value
  Black: less than 1.10
  Yellow: less than 0.70
  Magenta: less than 0.80
  Cyan: less than 0.90

<Ejection Quality>

Using an inkjet printer (IPSIO GX-5000, manufactured by Ricoh Company, Ltd.) in an environment where the temperature and the relative humidity were adjusted to 23° C. and 50% respectively, the ejection quality of each ink was evaluated in the following manner.

A chart to be printed as a pattern was continuously printed onto 20 sheets and then there was a pause in which printing was not carried out for 20 minutes. This process was repeated 50 times, and the chart was printed onto a total of 1,000 sheets. Thereafter, the chart was further printed onto one sheet, and the presence or absence of streaks, white spots (caused by absence of ink) and irregularly-jetted ink at a 5% chart solid portion on this sheet was evaluated by visual observation in accordance with the following evaluation criteria. Regarding the chart, a chart with a printed area which occupied 5% of the image region was printed at a duty of 100%, using each ink. As for printing conditions, the recording density was set at 360 dpi, and one-pass printing was employed.

(Evaluation Criteria)

A: There were no streaks, no white spots and no irregularly-jetted ink at the solid portion.

B: Streaks, white spots and irregularly-jetted ink were found at the solid portion to a small extent.

C: Streaks, white spots and irregularly-jetted ink were found all over the solid portion.

D: The ink was not ejected.

<Storage Stability>

Each ink was supplied to an ink cartridge, then stored at 65° C. for 3 weeks, and the thickened state and the aggregated state of the ink were evaluated in accordance with the following evaluation criteria. The extent (%) of thickness and the extent (%) of aggregation were calculated by means of the following expressions respectively.

[(Viscosity of ink after storage of 3 weeks at 65° C.)−(Initial viscosity)]/(Initial viscosity)×100

[(Average particle diameter of ink after storage of 3 weeks at 65° C.)−(Initial average particle diameter)]/(Initial average particle diameter)×100

(Evaluation Criteria)

A: The extent of thickness and the extent of aggregation were less than 2%.

B: The extent of thickness and the extent of aggregation were 2% or more, but less than 5%.

C: The extent of thickness and the extent of aggregation were 5% or more, but less than 10%.

D: The extent of thickness and the extent of aggregation were 10% or more.

TABLE 1

| Composition of ink | | Example | | | | | | | | | | | |
|---|---|---|---|---|---|---|---|---|---|---|---|---|---|
| | | 1 | 2 | 3 | 4 | 5 | 6 | 7 | 8 | 9 | 10 | 11 | 12 |
| Pigment dispersion | Black dispersion | 50.00 | — | — | — | 50.00 | — | — | — | 50.00 | — | — | — |
| | Cyan dispersion | — | 50.00 | — | — | — | 50.00 | — | — | — | 50.00 | — | — |
| | Magenta dispersion | — | — | 50.00 | — | — | — | 50.00 | — | — | — | 50.00 | — |
| | Yellow dispersion | — | — | — | 50.00 | — | — | — | 50.00 | — | — | — | 50.00 |
| Organic solvent | Organic solvent A | 15.00 | 8.00 | 8.00 | 8.00 | 15.00 | 8.00 | 8.00 | 8.00 | 15.00 | 8.00 | 8.00 | 8.00 |
| | Organic solvent B | 15.00 | 24.00 | 24.00 | 24.00 | 15.00 | 24.00 | 24.00 | 24.00 | 15.00 | 24.00 | 24.00 | 24.00 |
| Surfactant | Surfactant A-1 | 1.00 | — | — | — | — | — | 0.50 | — | 5.00 | — | — | — |
| | Surfactant A-2 | — | 1.00 | — | — | — | 0.50 | — | 0.50 | — | 5.00 | — | — |
| | Surfactant A-3 | — | — | 1.00 | — | 0.50 | — | — | — | — | — | 5.00 | — |
| | Surfactant A-4 | — | — | — | 1.00 | — | — | — | — | — | — | — | 5.00 |
| Anti-foaming agent | Anti-foaming agent | — | — | — | — | — | — | — | — | — | — | — | — |
| Water | Water | 19.00 | 17.00 | 17.00 | 17.00 | 19.50 | 17.50 | 17.50 | 17.50 | 15.00 | 13.00 | 13.00 | 13.00 |
| | Total [%] | 100.00 | 100.00 | 100.00 | 100.00 | 100.00 | 100.00 | 100.00 | 100.00 | 100.00 | 100.00 | 100.00 | 100.00 |
| | Foaming quality | A | A | A | A | A | A | A | A | B | B | B | B |
| | Defoaming quality | A | A | A | A | A | A | A | A | A | A | A | A |
| | Image density | A | A | A | A | B | B | B | B | A | A | A | A |
| | Ejection quality | A | A | A | A | B | B | A | A | B | B | B | B |
| | Storage stability | A | A | A | A | A | A | A | A | B | B | B | B |

TABLE 2

| Composition of ink | | Comparative Example | | | | | | | | | |
|---|---|---|---|---|---|---|---|---|---|---|---|
| | | 1 | 2 | 3 | 4 | 5 | 6 | 7 | 8 | 9 | 10 |
| Pigment dispersion | Black dispersion | 50.00 | — | — | — | 50.00 | — | — | — | 50.00 | — |
| | Cyan dispersion | — | 50.00 | — | — | — | 50.00 | — | — | — | 50.00 |
| | Magenta dispersion | — | — | 50.00 | — | — | — | 50.00 | — | — | — |
| | Yellow dispersion | — | — | — | 50.00 | — | — | — | 50.00 | — | — |
| Organic solvent | Organic solvent A | 15.00 | 8.00 | 8.00 | 8.00 | 15.00 | 8.00 | 8.00 | 8.00 | 15.00 | 8.00 |
| | Organic solvent B | 15.00 | 24.00 | 24.00 | 24.00 | 15.00 | 24.00 | 24.00 | 24.00 | 15.00 | 24.00 |
| Surfactant | Surfactant B | 2.50 | 2.50 | 1.50 | 0.50 | 2.50 | 0.50 | — | — | — | — |
| | Surfactant C | — | — | — | — | — | — | 1.00 | 5.00 | 0.50 | 1.00 |
| Anti-foaming agent | Anti-foaming agent | 0.10 | 0.10 | 0.10 | 0.10 | — | — | 0.10 | 0.10 | 0.10 | — |
| Water | Water | 17.40 | 15.40 | 16.40 | 17.40 | 17.50 | 17.50 | 16.90 | 12.90 | 19.40 | 17.00 |
| | Total [%] | 100.00 | 100.00 | 100.00 | 100.00 | 100.00 | 100.00 | 100.00 | 100.00 | 100.00 | 100.00 |
| | Foaming quality | C | C | C | B | D | C | B | C | B | C |
| | Defoaming quality | C | C | B | B | D | D | B | C | A | C |
| | Image density | A | A | C | C | D | C | C | C | D | C |
| | Ejection quality | B | B | C | C | D | C | C | C | C | C |
| | Storage stability | B | B | B | A | A | A | C | D | B | B |

As is evident from the results shown in Tables 1 and 2, the inks of Examples 1 to 12 were superior in foaming quality and defoaming quality and favorable in image density, ejection quality and storage stability.

Meanwhile, among Comparative Examples 1 to 6 in which the conventional surfactant B was used, the inks of Comparative Examples 1 and 2 foamed even with the anti-foaming agent and were poor in both foaming quality and defoaming quality. Regarding Comparative Examples 3 and 4, as a result of reducing the amount of the surfactant B, the defoaming quality of the ink of Comparative Example 3 improved and the foaming quality and defoaming quality of the ink of Comparative Example 4 improved; however, the permeability of both the inks of Comparative Examples 3 and 4 decreased, and thus there was a decrease in image density and a degradation of ejection quality. Regarding Comparative Examples 5 and 6 in which no anti-foaming agent was used, the results were extremely poor except for storage stability.

Regarding Comparative Examples 7 to 10 in which the conventional surfactant C was used, the image density was low and the ejection quality was poor, regardless of the amount of the surfactant and the presence or absence of the anti-foaming agent.

Examples 13 to 24 and Comparative Examples 11 to 20

In each of Examples 13 to 24 and Comparative Examples 11 to 20, the materials shown in "Composition of ink" in Table 3 or 4 were mixed, then a sodium hydroxide (10% by mass) aqueous solution was used to adjust the pH to 9.

Subsequently, the obtained solution was filtered through a membrane filter of 0.8 μm in average pore diameter. Inks of Examples 13 to 24 and Comparative Examples 11 to 20 were thus obtained.

The values written in relation to the materials in Tables below are based upon percent by mass. Also, the materials shown in Tables below are the same as the ones shown in Tables 1 and 2 except for the following surfactants A.

Surfactant A: surfactant A-5, represented by General Formula (a) (Rf=$C_4F_9$, potassium salt)

Surfactant A: surfactant A-6, represented by General Formula (a) (Rf=$C_4F_9$, lithium salt)

Surfactant A: surfactant A-7, represented by General Formula (a) (Rf=$C_4F_9$, sodium salt)

Surfactant A: surfactant A-8, represented by General Formula (a) (Rf=$C_4F_9$, ammonium salt)

The characteristics of the inks of Examples 13 to 24 and Comparative Examples 11 to 20 were evaluated in the same ways as the evaluations regarding the ink of Example 1. The results are shown in Tables 3 and 4.

TABLE 3

| | Composition of ink | Example | | | | | | | | | | | |
|---|---|---|---|---|---|---|---|---|---|---|---|---|---|
| | | 13 | 14 | 15 | 16 | 17 | 18 | 19 | 20 | 21 | 22 | 23 | 24 |
| Pigment dispersion | Black dispersion | 50.00 | — | — | — | 50.00 | — | — | — | 50.00 | — | — | — |
| | Cyan dispersion | — | 50.00 | — | — | — | 50.00 | — | — | — | 50.00 | — | — |
| | Magenta dispersion | — | — | 50.00 | — | — | — | 50.00 | — | — | — | 50.00 | — |
| | Yellow dispersion | — | — | — | 50.00 | — | — | — | 50.00 | — | — | — | 50.00 |
| Organic solvent | Organic solvent A | 15.00 | 8.00 | 8.00 | 8.00 | 15.00 | 8.00 | 8.00 | 8.00 | 15.00 | 8.00 | 8.00 | 8.00 |
| | Organic solvent B | 15.00 | 24.00 | 24.00 | 24.00 | 15.00 | 24.00 | 24.00 | 24.00 | 15.00 | 24.00 | 24.00 | 24.00 |
| Surfactant | Surfactant A-5 | 1.00 | — | — | — | — | — | 0.50 | — | 5.00 | — | — | — |
| | Surfactant A-6 | — | 1.00 | — | — | — | 0.50 | — | 0.50 | — | 5.00 | — | — |
| | Surfactant A-7 | — | — | 1.00 | — | 0.50 | — | — | — | — | — | 5.00 | — |
| | Surfactant A-8 | — | — | — | 1.00 | — | — | — | — | — | — | — | 5.00 |
| Anti-foaming agent | Anti-foaming agent | — | — | — | — | — | — | — | — | — | — | — | — |
| Water | Water | 19.00 | 17.00 | 17.00 | 17.00 | 19.50 | 17.50 | 17.50 | 17.50 | 15.00 | 13.00 | 13.00 | 13.00 |
| | Total [%] | 100.00 | 100.00 | 100.00 | 100.00 | 100.00 | 100.00 | 100.00 | 100.00 | 100.00 | 100.00 | 100.00 | 100.00 |
| | Foaming quality | A | A | A | A | A | A | A | A | B | B | B | B |
| | Defoaming quality | A | A | A | A | A | A | A | A | A | A | A | A |
| | Image density | A | A | A | A | A | B | B | B | A | A | A | A |
| | Ejection quality | A | A | A | A | B | B | A | A | B | B | B | A |
| | Storage stability | A | A | A | A | A | A | A | A | A | A | A | A |

TABLE 4

| | Composition of ink | Comparative Example | | | | | | | | | |
|---|---|---|---|---|---|---|---|---|---|---|---|
| | | 11 | 12 | 13 | 14 | 15 | 16 | 17 | 18 | 19 | 20 |
| Pigment dispersion | Black dispersion | 50.00 | — | — | — | 50.00 | — | — | — | 50.00 | — |
| | Cyan dispersion | — | 50.00 | — | — | — | 50.00 | — | — | — | 50.00 |
| | Magenta dispersion | — | — | 50.00 | — | — | — | 50.00 | — | — | — |
| | Yellow dispersion | — | — | — | 50.00 | — | — | — | 50.00 | — | — |
| Organic solvent | Organic solvent A | 15.00 | 8.00 | 8.00 | 8.00 | 15.00 | 8.00 | 8.00 | 8.00 | 15.00 | 8.00 |
| | Organic solvent B | 15.00 | 24.00 | 24.00 | 24.00 | 15.00 | 24.00 | 24.00 | 24.00 | 15.00 | 24.00 |
| Surfactant | Surfactant B | 2.50 | 2.50 | 1.50 | 0.50 | 2.50 | 0.50 | — | — | — | — |
| | Surfactant C | — | — | — | — | — | — | 1.00 | 5.00 | 0.50 | 1.00 |

TABLE 4-continued

| | | Comparative Example | | | | | | | | | |
|---|---|---|---|---|---|---|---|---|---|---|---|
| Composition of ink | | 11 | 12 | 13 | 14 | 15 | 16 | 17 | 18 | 19 | 20 |
| Anti-foaming agent | Anti-foaming agent | 0.10 | 0.10 | 0.10 | 0.10 | — | — | 0.10 | 0.10 | 0.10 | — |
| Water | Water | 17.40 | 15.40 | 16.40 | 17.40 | 17.50 | 17.50 | 16.90 | 12.90 | 19.40 | 17.00 |
| | Total [%] | 100.00 | 100.00 | 100.00 | 100.00 | 100.00 | 100.00 | 100.00 | 100.00 | 100.00 | 100.00 |
| | Foaming quality | C | C | C | B | D | C | B | C | B | C |
| | Defoaming quality | C | C | B | B | D | D | B | C | A | C |
| | Image density | A | A | C | C | D | C | C | C | D | C |
| | Ejection quality | B | B | C | C | D | C | C | C | C | C |
| | Storage stability | B | B | B | A | A | A | C | D | B | B |

As is evident from the results shown in Tables 3 and 4, the inks of Examples 13 to 24 were superior in foaming quality and defoaming quality and favorable in image density, ejection quality and storage stability.

Meanwhile, among Comparative Examples 11 to 16 in which the conventional surfactant B was used, the inks of Comparative Examples 11 and 12 foamed even with the anti-foaming agent and were poor in both foaming quality and defoaming quality. Regarding Comparative Examples 13 and 14, as a result of reducing the amount of the surfactant B, the defoaming quality of the ink of Comparative Example 13 improved and the foaming quality and defoaming quality of the ink of Comparative Example 14 improved; however, the permeability of both the inks of Comparative Examples 13 and 14 decreased, and thus there was a decrease in image density and a degradation of ejection quality. Regarding Comparative Examples 15 and 16 in which no anti-foaming agent was used, the results were extremely poor except for storage stability.

Regarding Comparative Examples 17 to 20 in which the conventional surfactant C was used, the image density was low and the ejection quality was poor, regardless of the amount of the surfactant and the presence or absence of the anti-foaming agent.

Examples 25 to 36 and Comparative Examples 21 to 30

Preparation of Polymer (Preparation of Polymer A)

The raw materials formulated as shown below were placed in a 2 L four-necked flask equipped with a dewatering pipe, a thermometer, a nitrogen gas introducing pipe and a stirrer. Subsequently, while removing water, the temperature was raised to 180° C. in 3 hours so as to cause dehydration condensation reaction. In this manner, a polyester resin was obtained.
(Synthetic Formulation of Polymer A)

| | |
|---|---|
| Decane epoxy ester (CARDURA E-10P, manufactured by Japan Epoxy Resins Co., Ltd.) | 10 parts by mass |
| Adipic acid | 27 parts by mass |
| Hexahydrophthalic anhydride | 42 parts by mass |
| Neopentyl glycol | 2 parts by mass |
| Trimethylolpropane | 26 parts by mass |
| Dibutyltin dioxide | 0.1 parts by mass |

(Polymer B)
Styrene-acrylic polymer (JONCRYL 586, manufactured by Johnson Polymer)

Preparation Example 5

Preparation of Cyan Millbase (Formulation of Cyan Millbase)

| | |
|---|---|
| Solvent Blue 70 (Oil-soluble dye, OLEOSOL FAST BLUE ELN, manufactured by Taoka Chemical Co., Ltd.) | 15 parts by mass |
| Fine alumina particles (APK-G008, manufactured by Sumitomo Chemical Co., Ltd,) | 3 parts by mass |
| Polymer B | 15 parts by mass |
| Ion-exchange water | 67 parts by mass |

To the polymer B, 2-amino-2-methyl-1,3-propanediol was added, these were dissolved in the water, and the oil-soluble Solvent Blue 70 and the fine alumina particles were mixed into the solution. When the mixture exhibited sufficient moistness, it was kneaded at 2,000 rpm for 60 minutes, using DYNO-MILL KDL Type-A (manufactured by WAB (Willy A. Bachofen AG)) as a kneader, supplied with zirconia beads (0.5 mm in diameter).

Three parts by mass of 1 N (normal) hydrochloric acid was added to the obtained millbase, which was followed by stirring, then 400 parts by mass of ion-exchange water was added, which was followed by sufficient stirring, then the mixture was divided into a dye paste and water using a centrifuge, and supernatant liquid was removed, which was repeated several times.

Subsequently, 1 part by mass of 2-amino-2-methyl-1,3-propanediol as a basic compound was added, then the mixture was kneaded using DYNO-MILL KDL Type-A again.

Subsequently, the millbase was taken out and filtered through a filter of 1 μm in average pore diameter, and a cyan millbase (dye concentration: 15% by mass) was thus obtained.

Preparation Example 6

Preparation of Magenta Millbase (Formulation of Magenta Millbase)

| | |
|---|---|
| Solvent Red 49 (Oil-soluble dye, OIL PINK 312, manufactured by ORIENT CHEMICAL INDUSTRIES CO., LTD.) | 15 parts by mass |

-continued

| | |
|---|---|
| Fine silica particles (AEROSIL-RX200, manufactured by Nippon Aerosil Co., Ltd.) | 5 parts by mass |
| Polymer B | 15 parts by mass |
| Ion-exchange water | 65 parts by mass |

The same process as in the preparation of the cyan millbase was carried out except that the formulation of the cyan millbase was changed to the formulation of the magenta millbase. In this manner, a magenta millbase (dye concentration: 15% by mass) was obtained.

Preparation Example 7

Preparation of Yellow Millbase (Formulation of Yellow Millbase)

| | |
|---|---|
| Disperse Yellow 160 (Disperse dye, PLAST YELLOW 8050, manufactured by ARIMOTO CHEMICAL CO., LTD.) | 15 part by mass |
| Polymer A | 15 parts by mass |
| Ion-exchange water | 70 parts by mass |

The same process as in the preparation of the cyan millbase was carried out except that the formulation of the cyan millbase was changed to the formulation of the yellow millbase. In this manner, a yellow millbase (dye concentration: 15% by mass) was obtained.

Preparation Example 8

Preparation of Black Millbase (Formulation of Black Millbase)

| | |
|---|---|
| Solvent Black 3 (Oil-soluble dye, OIL BLACK 860, manufactured by ORIENT CHEMICAL INDUSTRIES CO., LTD.) | 15 part by mass |
| Dispersant represented by the structural formula below $C_{12}H_{25}-O-(CH_2CH_2O)_{42}-H$ | 5 parts by mass |
| Ion-exchange water | 80 parts by mass |

The dispersant was dissolved in the ion-exchange water, and the Solvent Black 3 was mixed into the solution. When the mixture exhibited sufficient moistness, it was kneaded at 2,000 rpm for 60 minutes, using DYNO-MILL KDL Type-A (manufactured by WAB (Willy A. Bachofen AG)) as a kneader, supplied with zirconia beads (0.5 mm in diameter).

Subsequently, the millbase was taken out and filtered through a filter of 1 µm in average pore diameter, and a black millbase (dye concentration: 15% by mass) was thus obtained.

In each of Examples 25 to 36 and Comparative Examples 21 to 30, the materials shown in "Composition of ink" in Table 5 or 6 were mixed, then a sodium hydroxide (10% by mass) aqueous solution was used to adjust the pH to 9.

Subsequently, the obtained solution was filtered through a membrane filter of 0.8 µm in average pore diameter. Inks of Examples 25 to 36 and Comparative Examples 21 to 30 were thus obtained.

The values written in relation to the materials in Tables below are based upon percent by mass. Also, the materials shown in Tables below are the same as the ones shown in Tables 1 and 2 except for the following surfactants A.

Surfactant A: surfactant A-9, represented by General Formula (a') ($Rf=C_4F_9$, potassium salt)
Surfactant A: surfactant A-10, represented by General Formula (a') ($Rf=C_4F_9$, lithium salt)
Surfactant A: surfactant A-11, represented by General Formula (a') ($Rf=C_4F_9$, sodium salt)
Surfactant A: surfactant A-12, represented by General Formula (a') ($Rf=C_4F_9$, ammonium salt)

The characteristics of the inks of Examples 25 to 36 and Comparative Examples 21 to 30 were evaluated in the same ways as the evaluations regarding the ink of Example 1. The results are shown in Tables 5 and 6.

Also, properties of the inks were measured as follows. The results are shown in Tables 7 and 8.

<Ink Viscosity>

Using R-500 VISCOMETER (manufactured by TOKI SANGYO CO., LTD.), the viscosity of each ink was measured at 25° C. (cone: 1°34'×R24, rotational speed: 60 rpm, time for measurement: 30 minutes afterward).

<Volume Average Particle Diameter of Colorant in Ink>

The volume average particle diameter (D 50%) of the colorant in each ink was measured using a particle size distribution measuring apparatus (MICROTRACK UPA, manufactured by NIKKISO CO., LTD.).

<Dynamic Surface Tension>

Using BP-2 (manufactured by KRÜSS GmbH), the dynamic surface tension of each ink was measured at 25° C. such that the values at 15 ms, 150 ms and 1,500 ms were read.

TABLE 5

| | | Example | | | | | | | | | | | |
|---|---|---|---|---|---|---|---|---|---|---|---|---|---|
| Composition of ink | | 25 | 26 | 27 | 28 | 29 | 30 | 31 | 32 | 33 | 34 | 35 | 36 |
| Pigment dispersion | Black dispersion | 50.00 | — | — | — | 50.00 | — | — | — | — | — | — | — |
| | Cyan dispersion | — | — | — | — | — | 30.00 | — | — | — | — | — | — |
| | Magenta dispersion | — | — | 50.00 | — | — | — | — | — | — | — | 50.00 | — |
| | Yellow dispersion | — | — | — | — | — | — | — | 30.00 | — | — | — | — |
| Dye millbase | Black millbase | — | — | — | — | — | — | — | — | 50.00 | — | — | — |
| | Cyan millbase | — | 30.00 | — | — | — | — | — | — | — | 30.00 | — | — |
| | Magenta millbase | — | — | — | — | — | — | 50.00 | — | — | — | — | 30.00 |
| | Yellow millbase | — | — | — | 30.00 | — | — | — | — | — | — | — | — |
| Organic solvent | Organic solvent A | 15.00 | 8.00 | 8.00 | 8.00 | 15.00 | 8.00 | 8.00 | 8.00 | 15.00 | 8.00 | 8.00 | 8.00 |
| | Organic solvent B | 15.00 | 24.00 | 24.00 | 24.00 | 15.00 | 24.00 | 24.00 | 24.00 | 15.00 | 24.00 | 24.00 | 24.00 |
| Surfactant | Surfactant A-9 | 1.00 | — | — | — | — | — | 0.50 | — | 5.00 | — | — | — |
| | Surfactant A-10 | — | 1.00 | — | — | — | 0.50 | — | 0.50 | — | 5.00 | — | — |
| | Surfactant A-11 | — | — | 1.00 | — | 0.50 | — | — | — | — | — | 5.00 | — |
| | Surfactant A-12 | — | — | — | 1.00 | — | — | — | — | — | — | — | 5.00 |

TABLE 5-continued

| Composition of ink | | Example | | | | | | | | | | | |
|---|---|---|---|---|---|---|---|---|---|---|---|---|
| | | 25 | 26 | 27 | 28 | 29 | 30 | 31 | 32 | 33 | 34 | 35 | 36 |
| Anti-foaming agent | Anti-foaming agent | — | — | — | — | — | — | — | — | — | — | — | — |
| Water | Water | 19.00 | 37.00 | 17.00 | 37.00 | 19.50 | 37.50 | 17.50 | 37.50 | 15.00 | 33.00 | 13.00 | 33.00 |
| | Total [%] | 100.00 | 100.00 | 100.00 | 100.00 | 100.00 | 100.00 | 100.00 | 100.00 | 100.00 | 100.00 | 100.00 | 100.00 |
| | Foaming quality | A | A | A | A | A | A | A | A | B | B | B | B |
| | Defoaming quality | A | A | A | A | A | A | A | A | A | A | A | A |
| | Image density | A | A | A | A | A | B | B | B | A | A | A | A |
| | Ejection quality | A | A | A | A | B | B | A | A | B | B | B | A |
| | Storage stability | A | A | A | A | A | A | A | A | A | A | A | A |

TABLE 6

| Composition of ink | | Comparative Example | | | | | | | | | |
|---|---|---|---|---|---|---|---|---|---|---|---|
| | | 21 | 22 | 23 | 24 | 25 | 26 | 27 | 28 | 29 | 30 |
| Pigment dispersion | Black dispersion | 50.00 | — | — | — | — | — | — | — | 50.00 | — |
| | Cyan dispersion | — | — | — | — | — | 30.00 | — | — | — | 30.00 |
| | Magenta dispersion | — | — | 50.00 | — | — | — | — | — | — | — |
| | Yellow dispersion | — | — | — | — | — | — | — | 30.00 | — | — |
| Dye millbase | Black millbase | — | — | — | — | 50.00 | — | — | — | — | — |
| | Cyan millbase | — | 30.00 | — | — | — | — | — | — | — | — |
| | Magenta millbase | — | — | — | — | — | — | — | 50.00 | — | — |
| | Yellow millbase | — | — | — | 50.00 | — | — | — | — | — | — |
| Organic solvent | Organic solvent A | 15.00 | 8.00 | 8.00 | 8.00 | 15.00 | 8.00 | 8.00 | 8.00 | 15.00 | 8.00 |
| | Organic solvent B | 15.00 | 24.00 | 24.00 | 24.00 | 15.00 | 24.00 | 24.00 | 24.00 | 15.00 | 24.00 |
| Surfactant | Surfactant B | 2.50 | 2.50 | 1.50 | 0.50 | 2.50 | 0.50 | — | — | — | — |
| | Surfactant C | — | — | — | — | — | — | 1.00 | 5.00 | 0.50 | 1.00 |
| Anti-foaming agent | Anti-foaming agent | 0.10 | 0.10 | 0.10 | 0.10 | — | — | 0.10 | 0.10 | 0.10 | — |
| Water | Water | 17.40 | 35.40 | 16.40 | 17.40 | 17.50 | 37.50 | 16.90 | 32.90 | 19.40 | 37.00 |
| | Total [%] | 100.00 | 100.00 | 100.00 | 100.00 | 100.00 | 100.00 | 100.00 | 100.00 | 100.00 | 100.00 |
| | Foaming quality | C | C | C | B | D | C | B | C | B | C |
| | Defoaming quality | C | C | B | B | D | D | B | C | A | C |
| | Image density | A | A | C | C | D | C | C | C | D | C |
| | Ejection quality | B | B | C | C | D | C | C | C | C | C |
| | Storage stability | B | B | B | A | A | A | C | D | B | B |

TABLE 7

| Ink property and evaluation | | | Example | | | | | | | | | | | |
|---|---|---|---|---|---|---|---|---|---|---|---|---|---|---|
| | | | 25 | 26 | 27 | 28 | 29 | 30 | 31 | 32 | 33 | 34 | 35 | 36 |
| Viscosity | 50 rpm | mPa·s | 7.0 | 6.5 | 6.8 | 6.2 | 6.9 | 6.6 | 6.9 | 6.5 | 6.8 | 6.1 | 6.2 | 6.3 |
| Average particle diameter | D 50 | nm | 110.6 | 86.7 | 89.3 | 81.2 | 105.7 | 85.5 | 87.6 | 79.9 | 95.1 | 77.5 | 89.1 | 71.0 |
| Dynamic surface tension | 15 ms | mN/m | 38.2 | 38.1 | 37.9 | 38.8 | 39.1 | 40.2 | 41.5 | 39.4 | 36.1 | 35.6 | 36.0 | 35.4 |
| | 150 ms | mN/m | 32.2 | 31.2 | 31.3 | 31.5 | 33.6 | 33.4 | 34.6 | 35.1 | 29.5 | 27.8 | 28.4 | 27.8 |
| | 1,500 ms | mN/m | 30.8 | 30.7 | 30.1 | 30.6 | 31.9 | 32.4 | 31.8 | 31.9 | 28.4 | 25.6 | 25.5 | 25.8 |

TABLE 8

| Ink property and evaluation | | | Comparative Example | | | | | | | | | |
|---|---|---|---|---|---|---|---|---|---|---|---|---|
| | | | 21 | 22 | 23 | 24 | 25 | 26 | 27 | 28 | 29 | 30 |
| Viscosity | 50 rpm | mPa·s | 7.5 | 6.9 | 6.8 | 6.5 | 6.5 | 6.4 | 7.9 | 12.0 | 7.9 | 6.8 |
| Average particle diameter | D 50 | nm | 125.4 | 95.1 | 89.9 | 82.5 | 89.8 | 88.4 | 124.6 | 240.6 | 116.1 | 81.2 |
| Dynamic surface tension | 15 ms | mN/m | 38.0 | 36.0 | 39.1 | 40.1 | 38.3 | 40.5 | 44.6 | 40.3 | 48.6 | 43.8 |
| | 150 ms | mN/m | 31.0 | 32.9 | 33.4 | 36.5 | 33.5 | 35.5 | 39.8 | 36.9 | 40.5 | 37.2 |
| | 1,500 ms | mN/m | 29.2 | 28.6 | 31.8 | 33.6 | 31.0 | 31.9 | 37.4 | 34.4 | 38.3 | 36.7 |

As is evident from the results shown in Tables 5 and 6, the inks of Examples 25 to 36 were superior in foaming quality and defoaming quality and favorable in image density, ejection quality and storage stability.

Meanwhile, among Comparative Examples 21 to 26 in which the conventional surfactant B was used, the inks of Comparative Examples 21 and 22 foamed even with the anti-foaming agent and were poor in both foaming quality and defoaming quality. Regarding Comparative Examples 23 and 24, as a result of reducing the amount of the surfactant B, the defoaming quality of the ink of Comparative Example 23 improved and the foaming quality and defoaming quality of the ink of Comparative Example 24 improved; however, the permeability of both the inks of Comparative Examples 23 and 24 decreased, and thus there was a decrease in image density and a degradation of ejection quality. Regarding Comparative Examples 25 and 26 in which no anti-foaming agent was used, the results were extremely poor except for storage stability.

Regarding Comparative Examples 27 to 30 in which the conventional surfactant C was used, the image density was low and the ejection quality was poor, regardless of the amount of the surfactant and the presence or absence of the anti-foaming agent.

Examples 37 to 49 and Comparative
Examples 31 and 32

Preparation Example 9

Preparation of Surface-Treated Carbon Black Dispersion

Into 3,000 mL of 2.5 N (normal) sodium sulfate solution, 90 g of carbon black (SEAST #9, manufactured by TOKAI CARBON CO., LTD.) having a nitrogen adsorption specific surface area of 142 $m^2/g$ and having a DBP oil absorption of 115 mL/100 g was added, then the mixture was stirred at a temperature of 60° C. and a rotational speed of 300 rpm and subjected to reaction for 10 hours, and the carbon black was thus oxidized.

This reaction solution was filtered, then the carbon black having been filtered out was neutralized with a sodium hydroxide solution and subsequently subjected to ultrafiltration.

Further, the obtained carbon black was washed with water, dried, then dispersed into purified water such that its concentration was 20% by mass. In this manner, a surface-treated carbon black dispersion was obtained.

Preparation Example 10

Preparation of Carbon Black Dispersion Treated with Diazo Compound

One hundred grams of carbon black (#960, manufactured by Mitsubishi Chemical Corporation) having a nitrogen adsorption specific surface area of 260 $m^2/g$ and having a DBP oil absorption of 69 mL/100 g, thirty-four grams of p-amino-N-benzoic acid and 750 g of water were mixed and dispersed. Sixteen grams of nitric acid was applied dropwise to the mixture, and stirring was carried out at 70° C. Five minutes later, a solution prepared by dissolving 11 g of sodium nitrite in 50 g of water was added, and stirring was carried out for 1 hour.

The obtained slurry was diluted tenfold and then centrifuged so as to remove coarse particles from the slurry.

Thereafter, the pH of the slurry was adjusted to the range of 8 to 9 using diethanol amine, and the slurry was desalinated and concentrated using an ultrafiltration membrane so as to obtain a carbon black dispersion having a pigment concentration of 15% by mass. Further, this carbon black dispersion was filtered through a filter (made of polypropylene) having an average pore diameter of 0.5 μm so as to obtain an intended carbon black dispersion.

Synthesis Example 1

Preparation of Polymer Dispersion Liquid

The atmosphere inside a 1 L flask equipped with a mechanical stirrer, a thermometer, a nitrogen gas introducing pipe, a reflux tube and a dripping funnel was adequately replaced by nitrogen gas, then 11.2 g of styrene, 2.8 g of acrylic acid, 12.0 g of lauryl methacrylate, 4.0 g of polyethylene glycol methacrylate, 4.0 g of a styrene macromer (product name: AS-6, manufactured by Toagosei Co., Ltd.) and 0.4 g of mercaptoethanol were placed in the flask, and the temperature was raised to 65° C.

Next, there was prepared a mixed solution of 100.8 g of styrene, 25.2 g of acrylic acid, 108.0 g of lauryl methacrylate, 36.0 g of polyethylene glycol methacrylate, 60.0 g of hydroxyethyl methacrylate, 36.0 g of a styrene macromer (product name: AS-6 manufactured by Toagosei Co., Ltd.), 3.6 g of mercaptoethanol, 2.4 g of azobisdimethylvaleronitrile and 18 g of methyl ethyl ketone, and this mixed solution was poured dropwise into the flask in 2.5 hours.

After the mixed solution had finished being poured dropwise, a mixed solution of 0.8 g of azobisdimethylvaleronitrile and 18 g of methyl ethyl ketone was applied dropwise into the flask in 0.5 hours. The ingredients were aged at 65° C. for 1 hour, then 0.8 g of azobisdimethylvaleronitrile was added, and further, the ingredients were aged for 1 hour.

After the reaction had finished, 364 g of methyl ethyl ketone was poured into the flask, and 800 g of a polymer solution having a concentration of 50% by mass was thus obtained.

Preparation Example 11

Preparation of Fine Polymer Particle Dispersion which Contains Phthalocyanine Pigment Twenty-eight grams of the polymer solution produced in Synthesis Example 1, 26 g of C.I. Pigment Blue 15:3 (pigment), 13.6 g of 1 mol/L potassium hydroxide solution, 20 g of methyl ethyl ketone and 30 g of ion-exchange water were sufficiently stirred and then kneaded using a triple roll mill.

The obtained paste was poured into 200 g of ion-exchange water, which was followed by sufficient stirring. Thereafter, the methyl ethyl ketone and the water were distilled away using an evaporator, and a cyan fine polymer particle dispersion was thus obtained.

Preparation Example 12

Preparation of Fine Polymer Particle Dispersion which Contains Carbon Black

The same process as in Preparation Example 11 was carried out except that the pigment was changed to carbon black (#960, manufactured by Mitsubishi Chemical Corporation). In this manner, a black fine polymer particle dispersion was obtained.

Preparation Example 13

Preparation of Dimethylquinacridone Pigment Dispersion

One hundred and fifty grams of C.I. Pigment Red 122, fifty-six grams of polyoxyethylene (n=40)-β-naphthyl ether and 794 g of purified water were premixed and then dispersed in a circulatory manner using a disc-type bead mill (KDL-TYPE MEDIA, manufactured by SHINMARU ENTERPRISES CORPORATION; with zirconia beads of 0.3 mm in diameter) so as to obtain a pigment dispersion.

The beads and the liquid were separated, then a urethane resin emulsion (TAKELAC W5661) was added, and a magenta pigment dispersion was thus obtained.

Preparation Example 14

Preparation of Monoazo Yellow Pigment Dispersion

The same process as in Preparation Example 13 was carried out except that the pigment was changed to Pigment Yellow 74. In this manner, a yellow pigment dispersion was obtained.

In each of Examples 37 to 49 and Comparative Examples 31 and 32, the materials shown in "Composition of ink" in Table 9 were mixed, then a sodium hydroxide (10% by mass) aqueous solution was used to adjust the pH to 9.

Subsequently, the obtained solution was filtered through a membrane filter of 0.8 μm in average pore diameter. Inks of Examples 37 to 49 and Comparative Examples 31 and 32 were thus obtained.

The values written in relation to the materials in Table below are based upon percent by mass. Also, the materials shown in Table below are the same as the ones shown in Tables 1 and 2 except for the following surfactants A and D.

Surfactant A: fluorochemical surfactant A-13, represented by General Formula (h) (sodium salt)
Surfactant A: fluorochemical surfactant A-14, represented by General Formula (h) (potassium salt)
Surfactant D: compound represented by the chemical formula below

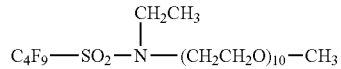

The characteristics of the inks of Examples 37 to 49 and Comparative Examples 31 and 32 were evaluated. The foaming quality, defoaming quality, storage stability and ejection quality of each ink were evaluated in the same ways as the evaluations regarding the ink of Example 1. Image bleeding in relation to each ink was evaluated as follows. The results are shown in Table 10.

<Image Bleeding>

Each ink was supplied to an ink cartridge, then images were printed onto MY PAPER (manufactured by NBS Ricoh Co., Ltd.) at a resolution of 600 dpi, and the extent of ink bleeding on the images was evaluated in accordance with the following evaluation criteria.

(Evaluation Criteria)
A: Ink bleeding was hardly found, and sharp images were formed.
B: Slight ink bleeding was found at edges of images.
C: On the whole, blurring and deformation of thin lines were found.
D: White spots formed and thin lines deformed, thereby degrading image quality.

TABLE 9

| | | Example | | | | | | | | | | | | | Comparative Example | |
|---|---|---|---|---|---|---|---|---|---|---|---|---|---|---|---|---|
| | | 37 | 38 | 39 | 40 | 41 | 42 | 43 | 44 | 45 | 46 | 47 | 48 | 49 | 31 | 32 |
| Pigment dispersion | Prep. Ex. 9 (as solid content) | 7 | | | | | | | | | | | | | | |
| | Prep. Ex. 10 (as solid content) | | 8 | | | | | 7 | | | | | | | | |
| | Prep. Ex. 11 (as solid content) | | | 6 | | | | | 6 | 6 | | 6 | 6 | 6 | 6 | 6 |
| | Prep. Ex. 12 (as solid content) | | | | 8 | | | | | | | | | | | |
| | Prep. Ex. 13 (as solid content) | | | | | 6 | | | | | 6 | | | | | |
| | Prep. Ex. 14 (as solid content) | | | | | | 5 | | | | | | | | | |
| Resin | SUNMORL EW102 | 3 | | | | | | | | | | | | | | |
| Wetting agent | Glycerin | 15 | 15 | 15 | 15 | 15 | 15 | 15 | 15 | 15 | 15 | 15 | 15 | 15 | 15 | 15 |
| | 1,3-butanediol | | | | | | | | | | | | | | | |
| | 1,5-pentanediol | | | | | | | | | 20 | 20 | | | | | |
| | 1,6-hexanediol | | | | | | | | | | | | | | | |
| | 3-methyl-1,3-butanediol | 20 | 20 | 20 | 20 | 20 | 20 | 20 | 20 | | | 20 | 20 | 20 | 20 | 20 |
| Surfactant | Surfactant A-13 (M = Na) | | | | | | | 0.5 | 0.5 | | | | | | | |
| | Surfactant A-14 (M = K) | 0.5 | 0.5 | 0.5 | 0.5 | 0.5 | 0.5 | | | 0.5 | 0.5 | 1.2 | 1.8 | 2.5 | | |
| | Surfactant D | | | | | | | | | | | | | | 0.5 | |
| Water | Purified water | 54.5 | 56.5 | 58.5 | 56.5 | 58.5 | 59.5 | 57.5 | 58.5 | 58.5 | 58.5 | 57.8 | 57.2 | 56.5 | 58.5 | 59 |
| | Total | 100 | 100 | 100 | 100 | 100 | 100 | 100 | 100 | 100 | 100 | 100 | 100 | 100 | 100 | 100 |

TABLE 10

| Ink property and evaluation | | | Example 37 | 38 | 39 | 40 | 41 | 42 | 43 | 44 | 45 | 46 | 47 | 48 | 49 | Comparative Example 31 | 32 |
|---|---|---|---|---|---|---|---|---|---|---|---|---|---|---|---|---|---|
| Viscosity | 50 rpm | mPa·s | 7.2 | 7.0 | 7.0 | 7.1 | 7.0 | 7.0 | 7.0 | 7.0 | 6.5 | 6.3 | 7.2 | 7.2 | 7.4 | 7.2 | 6.9 |
| Average particle diameter | D 50 | nm | 102 | 100 | 105 | 98 | 101 | 96 | 100 | 105 | 105 | 105 | 105 | 105 | 106 | 105 | 105 |
| Dynamic surface tension | 15 ms | mN/m | 38.2 | 38.2 | 37.5 | 38.5 | 38.1 | 38.2 | 38.1 | 37.8 | 38.8 | 39.1 | 37.0 | 36.8 | 36.7 | 38.3 | 48 |
| | 150 ms | mN/m | 32.2 | 32.1 | 31.6 | 32.7 | 32.2 | 32.4 | 32.2 | 32.0 | 32.9 | 33.0 | 31.4 | 31.3 | 31.2 | 28.4 | 47.6 |
| | 1,500 ms | mN/m | 30.9 | 31.0 | 30.2 | 31.4 | 31.2 | 31.5 | 31.0 | 30.6 | 31.6 | 31.8 | 30.3 | 30.1 | 30.0 | 26.5 | 47.6 |
| Foaming quality | | | A | A | A | A | A | A | A | A | A | A | A | A | A | D | A |
| Defoaming quality | | | A | A | A | A | A | A | A | A | A | A | A | A | A | D | A |
| Storage stability | | | A | A | A | A | A | A | A | A | A | A | A | B | B | B | B |
| Ejection quality | | | A | A | A | A | A | A | A | A | A | A | A | A | B | C | C |
| Image bleeding | | | A | A | A | A | A | A | A | A | A | A | A | A | B | B | D |

As is evident from the results shown in Table 10, the inks of Examples 37 to 49 were superior in foaming quality and defoaming quality and favorable in image density, ejection quality and storage stability.

Meanwhile, the ink of Comparative Example 31, in which the conventional surfactant D was used, was poor in foaming quality and defoaming quality and problematic in terms of ejection quality. The ink of Comparative Example 32, in which no surfactant was used, had such high surface tension that image bleeding was caused, and this ink was poor in drying capability and does not easily become wet to members of a supply passage, thereby making ink ejection unstable.

The invention claimed is:

1. An inkjet recording ink comprising:
water;
a water-soluble organic solvent;
a colorant; and
at least one fluorochemical surfactant having a formula selected from the group consisting of (b), (a), (a'), and (h):

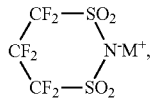
(b)

[(RfSO$_2$)$_2$]N$^-$M$^+$      (a),

[(RfSO$_2$)(RSO$_2$)]N$^-$M$^+$      (a'),

[(FSO$_2$)$_2$]N$^-$M$^+$      (h), wherein
M$^+$ is Li$^+$, Na$^+$, K$^+$, or NH$_4^+$,
Rf is CF$_3$, C$_2$F$_5$, C$_3$F$_7$, or C$_4$F$_9$, and
R is C1-C10 alkyl group.

2. The ink of claim 1, wherein a content of the fluorochemical surfactant in the ink is from 0.5% to 5% by mass based on a total mass of the ink.

3. The ink of claim 1, wherein the water-soluble organic solvent is at least one selected from the group consisting of glycerin and 1,3-butanediol.

4. The ink of claim 1, wherein the colorant is contained in fine polymer particles.

5. The ink of claim 4, wherein the colorant is at least one dye selected from the group consisting of an oil-soluble dye and a disperse dye.

6. The ink of claim 1, having a viscosity of 5 mPa·sec to 20 mPa·sec at 25° C.

7. The ink of claim 6, having a viscosity of 5 mPa·sec to 10 mPa·sec at 25° C.

8. The ink of claim 1, having a surface tension of 22 mN/m to 55 mN/m at 20° C.

9. The ink of claim 1, having a pH of 7 to 10.

10. The ink of claim 1, wherein the colorant has a volume average particle diameter of 77.5 nm to 110.6 nm.

11. The ink of claim 1, further comprising fine resin particles.

12. An ink cartridge, comprising a container comprising an inkjet recording ink, wherein ink comprises: water; a water-soluble organic solvent; a colorant; and at least one fluorochemical surfactant having a formula selected from the group consisting of (b), (a), (a'), and (h):

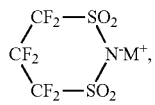
(b)

[(RfSO$_2$)$_2$]N$^-$M$^+$      (a),

[(RfSO$_2$)(RSO$_2$)]N$^-$M$^+$      (a'),

[(FSO$_2$)$_2$]N$^-$M$^+$      (h), wherein
M$^+$ is Li$^+$, Na$^+$, K$^+$, or NH$_4^+$,
Rf is CF$_3$, C$_2$F$_5$, C$_3$F$_7$, or C$_4$F$_9$, and
R is C1-C10 alkyl group.

13. An inkjet recording apparatus, comprising an inkjet recording ink comprising: water; a water-soluble organic solvent; a colorant; and at least one fluorochemical surfactant having a formula selected from the group consisting of (b), (a), (a'), and (h):

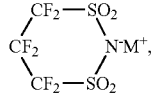
(b)

[(RfSO$_2$)$_2$]N$^-$M$^+$      (a),

[(RfSO$_2$)(RSO$_2$)]N$^-$M$^+$      (a'),

[(FSO$_2$)$_2$]N$^-$M$^+$      (h), wherein
M$^+$ is Li$^+$, Na$^+$, K$^+$, or NH$_4^+$,
Rf is CF$_3$, C$_2$F$_5$, C$_3$F$_7$, or C$_4$F$_9$, and
R is C1-C10 alkyl group.

14. The ink of claim 1, wherein the fluorochemical surfactant has the formula (b) and a content of the fluorochemical surfactant is from 0.5% to 5% by mass based on a total mass of the ink.

15. The ink of claim 1, wherein the fluorochemical surfactant has the formula (a) and a content of the fluorochemical surfactant is from 0.5% to 5% by mass based on a total mass of the ink.

16. The ink of claim 1, wherein the fluorochemical surfactant has the formula (a') and a content of the fluorochemical surfactant is from 0.5% to 5% by mass based on a total mass of the ink.

17. The ink of claim 1, wherein the fluorochemical surfactant has the formula (h) and a content of the fluorochemical surfactant in the ink is from 0.05% to 2% by mass based on a total mass of the ink.

18. The ink of claim 1, wherein a content of the water-soluble organic solvent in the ink is from 10% to 50% by mass based on a total mass of the ink.

19. The ink of claim 1, wherein a content of the water-soluble organic solvent in the ink is from 20% to 40% by mass based on a total mass of the ink.

20. The ink of claim 11, wherein the fine resin particles have a volume average particle diameter of 40 nm to 200 nm.

* * * * *